United States Patent
Saito

(10) Patent No.: US 7,050,368 B2
(45) Date of Patent: May 23, 2006

(54) DATA COPYING MANAGING METHOD AND DEVICE AND COPY MANAGING SYSTEM

(75) Inventor: Yuji Saito, Tokyo (JP)

(73) Assignee: Sony Corporation, Tokyo (JP)

( * ) Notice: Subject to any disclaimer, the term of this patent is extended or adjusted under 35 U.S.C. 154(b) by 287 days.

(21) Appl. No.: 10/220,300

(22) PCT Filed: Dec. 28, 2001

(86) PCT No.: PCT/JP01/11679

§ 371 (c)(1),
(2), (4) Date: Jan. 8, 2003

(87) PCT Pub. No.: WO02/056312

PCT Pub. Date: Jul. 18, 2002

(65) Prior Publication Data

US 2003/0123347 A1 Jul. 3, 2003

(30) Foreign Application Priority Data

Jan. 12, 2001 (JP) ............................. 2001-005750

(51) Int. Cl.
*G11B 7/00* (2006.01)
(52) U.S. Cl. ............................. 369/47.12; 369/47.13; 369/53.21
(58) Field of Classification Search ............ 369/47.12, 369/47.13, 53.21
See application file for complete search history.

(56) References Cited

U.S. PATENT DOCUMENTS

2002/0046178 A1* 4/2002 Morito et al. .................. 705/51
2003/0012098 A1* 1/2003 Sako et al. ............... 369/47.12
2003/0117920 A1* 6/2003 Sako et al. ............... 369/53.21

FOREIGN PATENT DOCUMENTS

| JP | 10-97785 | 4/1998 |
|---|---|---|
| JP | 11-283325 | 10/1999 |
| JP | 2000-268497 | 9/2000 |

* cited by examiner

*Primary Examiner*—Andrea Wellington
*Assistant Examiner*—Lixi Chow
(74) *Attorney, Agent, or Firm*—Oblon, Spivak, McClelland, Maier & Neustadt, P.C.

(57) ABSTRACT

A system for managing the number of duplicates of digital data even when a variety of recording mediums capable of repeated recording are used. The statement of the values of the number of seconds of the recording time recorded in a UTOC sector 2 of a mini-disc is differentiated between a case of recording using a conventional duplication route duplicating the audio data from a CD block (4) and a case of recording using a new duplication route of duplicating audio data from a hard disc (3) through a host controller (2). The recording time the statement of which is differentiated depending on the routes of duplication or the discrimination information of the audio data is managed by the host controller (2) to perform duplication number management.

33 Claims, 15 Drawing Sheets

CHKOUT. LST

| AUDIO DATA FILENAME | ALBUM INFORMATION | TIME | MAKER CODE | MODEL CODE |
|---|---|---|---|---|
| 1 2 3 4 5 6 | 7 8 9 0 1 2 | 17:35:01 | 0 1 | 5 0 |
| 1 2 3 4 5 6 | 7 8 9 0 1 2 | 17:41:02 | 0 1 | 5 0 |
| 1 2 3 4 5 6 | 7 8 9 0 1 2 | 17:45:03 | 0 1 | 5 0 |
| ⋮ | ⋮ | ⋮ | ⋮ | ⋮ |

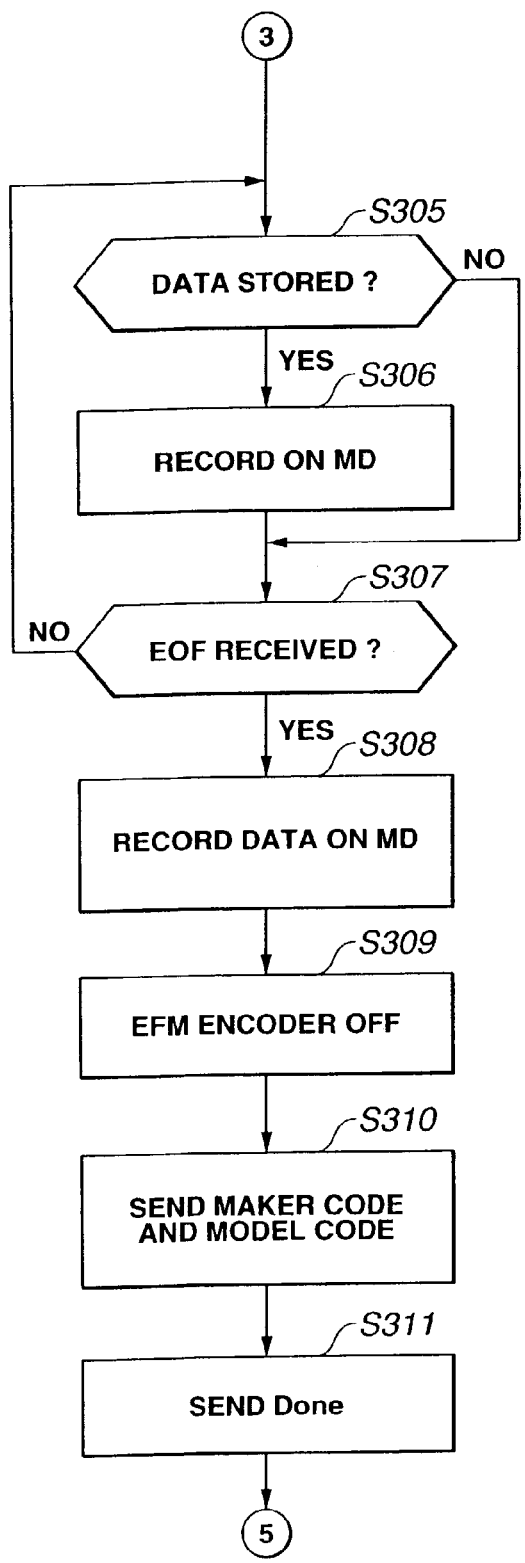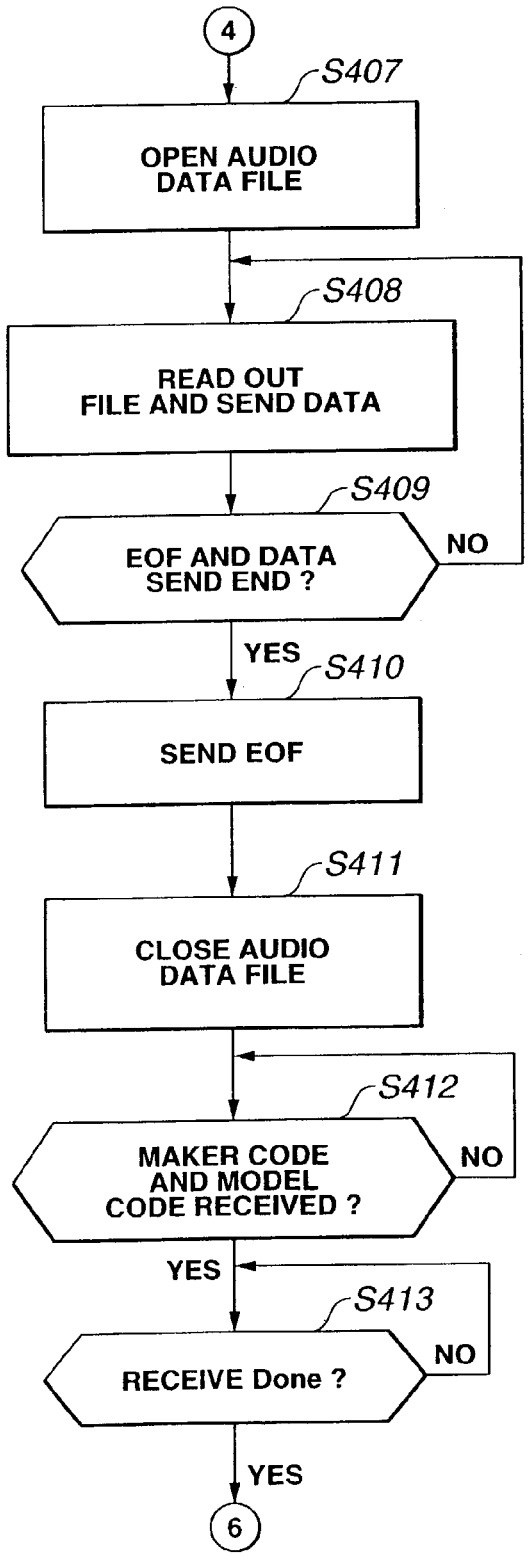
FIG.14A  FIG.14B

DATA COPYING MANAGING METHOD AND DEVICE AND COPY MANAGING SYSTEM

TECHNICAL FIELD

This invention relates to a duplication management method, a duplication management system, a recording device and a duplication management device for such a case where the main information, such as audio data, is to be recorded on a small-sized magneto-optical disc, termed a mini-disc (MD).

BACKGROUND ART

Up to now, it has been practiced to interconnect a reproducing device for a compact disc (CD), as a recording medium holding digital audio data recorded thereon, and a recording device for a mini-disc (MD), as a recording medium which permits data recording a number of times, and to duplicate the digital audio data, recorded on the compact disc, on the mini-disc, for personal exploitation.

Recently, with the coming into widespread use of personal computers, music distribution services over the Internet also have come to be used, such that, as the user staying at home is able to have the targeted digital audio data distributed over the Internet through use of the personal computers.

The digital audio data, distributed over the Internet, is stored in for example the hard disc of the personal computer so as to be reproduced using the personal computer. The digital audio data may also be duplicated (ripped or dubbed) lo an external memory employing a semiconductor device, termed a memory card, or an external storage medium, such as mini-disc, so as to be reproduced and exploited using a memory card player or a MD player.

It should be noted that a large quantity of the audio data may be stored in the hard disc of the personal computer, or the digital audio data can be duplicated (copied) on an external storage medium, such as a memory card, extremely readily. It may thus be feared that unauthorized duplication of the digital audio data, taken into a personal computer from a compact disc, or audio data distributed over e.g., the Internet and taken into the personal computer, is made repeatedly, thus illicitly impairing the benefit of the copyright owner of the digital audio data.

Thus, in order to develop a unified system of the copyright protecting technique that may be used in common on the global basis, more than 130 business establishments and organizations from the business circles of the phonogram, computers and electronics for domestic use have organized a forum called SDMI (Secure Digital Music Initiative) with a view to preparing a framework preventing illicit use of music files (digital audio data) and to for promoting lawful music distribution services. system of limiting or supervising the number of duplications of the audio data. FIG. 1 shows an instance of employing this system. Referring to FIG. 1, a personal computer 200 is supplied with digital audio data from a CD player 100 or over the Internet 300 to take the digital audio data into its built-in hard disc.

In duplicating the digital audio data, thus taken into the personal computer 200, on so-called memory cards, the number of duplication of the digital audio data is limited on the personal computer 200 to three or less. FIG. 1 shows a case where the same digital audio data is duplicated from the personal computer 200 to each of three memory cards 301 to 303.

The memory cards 301 to 303 each are a new external storage medium which recently is finding use in increasing numbers. Each of the memory cards has a medium identification ID (medium identification information) proper to each memory card. The personal computer 200 is supplied from the memory card, to which the digital audio data is output, with the medium identification ID of the memory card, based on which the management may be performed as to which digital data has been output to which memory card.

If, in the memory card, supplied with the digital audio data from the personal computer 200 and which has stored the digital audio data, the digital audio data has been deleted, as by returning it to the personal computer 200, the number of the memory cards on which the digital audio data has been duplicated is decreased by one, so that duplication of the digital audio data to a new memory card is allowed.

In such system, prepared by SDMI, which imposes limitations on the allowed number of duplicates of digital audio data, up lo three duplicates of the digital audio data, taken into the personal computer 200, are allowed. If the digital audio data, as a duplicate, is deleted as by being returned to the personal computer 200, the number of the duplicates is decreased, so that duplication to eke out the decrease is allowed.

Even although the number of duplications is limited, duplication for personal use is allowed, as conventionally, so that convenience for the user of the digital audio data is not impaired, at the same time as unauthorized duplication of the digital audio data in large quantities is inhibited to prohibit the benefit of the copyright owner of the digital audio data from being illicitly infringed.

Meanwhile, in this system of limiting the number of duplicates of the digital audio data, the outputting of digital audio data from the personal computer 200 to the memory card is termed the check-out, while the deletion of the digital audio data from the memory card which has gone through the check-out of the digital audio data to the personal computer 200 as the source of the digital audio data in a manner of returning the data to the personal computer is termed the check-in.

This system of limiting the number of duplicates of the digital audio data is among the copyright protecting techniques applicable to the case of using the so-called memory card, having the medium identification ID as a recording medium, while it is not applicable to the case of using the mini-disc which is now in widespread use. That is, no medium identification ID proper to each mini-disc is not provided to the mini-disc.

The mini-disc is in widespread use as a recording medium, such that the digital audio data from e.g., the CD player may be recorded on the mini-disc, using a mini-disc recorder. Thus, as for the audio data recorded on the mini-disc, it is necessary that clear distinction can be made between the mini-disc on which recording has been made through a conventional channel not subjected to the duplicate number management and the mini-disc on which recording has been made through a new channel of the check-out/check-in system subjected to the duplicate number management.

If the copyright protection technique of the SDMI system, which manages the allowed number of the duplicates of the digital audio data described above, cannot be applied to the case of using the recording medium which is now finding widespread use, such as mini-discs, it is not possible to prevent unauthorized duplication of the digital audio data to prevent the benefit on the part of the copyright owner of the digital audio data from being infringed illicitly. It is therefore a desideratum that copyright protection technique of the SDMI system, which manages the allowed number of the duplicates of the digital audio data described above can be applied to the mini-discs which are currently in widespread use.

On the other hand, the digital audio data stored on the hard disc or on the memory card are encrypted in a preset manner, while being audio-compressed by a technique exemplified by the ATRAC3 (Acoustic Transform Acoustic Coding).

Moreover, the conventional mini-disc recording and/or reproducing apparatus, while coping with the audio compression technique, fails to cope with the encryption.

Thus, it is not possible with the mini-disc recording and/or reproducing apparatus to discriminate whether the compressed digital audio signals, recorded on the mini-disc, are derived from the Internet or a hard disc or directly from the output of the CD player, and hence the source channel has to be supervised in the perspective of the copyright management.

Unless it is discriminated in the mini-disc recording and/or reproducing apparatus whether the compressed digital audio signals recorded on the mini-disc are compressed and encrypted digital audio signals which should be managed as to the number of allowed duplicates or the compressed and non-encrypted digital audio signals which do not have to be managed as to the number of allowed duplicates, disorder may be produced such as erroneously applying check-in/check-out to the compressed non-encrypted digital audio signals directly duplicated from the CD player.

DISCLOSURE OF THE INVENTION

It is therefore an object of the present invention to provide a duplication management method, a duplication management system, a recording device and a duplication management device in which, even with the use of variable recording mediums, it is possible to supervise the number of duplicates of digital data.

For solving the above problem and accomplishing the above object, the present invention provides a duplication management method in duplicating the main information to a recording medium having a main information area in which the main information is recorded and a management area in which the management information for each item of the main information recorded in the main information area is recorded, wherein the main information can be duplicated to the recording medium through one of a first route for duplicating the main information without performing duplication number management and a second route for duplicating the main information with duplication number management. The statement of a portion of the management information for the main information duplicated to the recording medium through the first route is differentiated from the statement of a portion of the management information for the main information duplicated to the recording medium through the second route. The portion of the management information is stored and held as duplication hysteresis information at least in case the main information is duplicated to the recording medium through the second route.

With the duplication management method of the present invention, the statement of the portion of the management information recorded in the management area of the recording medium in association with the main information is differentiated between the case of recording the main information through the first route on the recording medium and the case of recording the main information through the second route on the recording medium. The portion of the management information, the statement of which is differentiated depending on the routes of duplication, is stored as the duplication hysteresis information on the part of the duplication management device (host controller) or on the part of a device outputting main data. In this manner, it can be clearly distinguished, based on the portion of the management information, the statement of which is differentiated depending on the duplication routes, whether the main information recorded on the recording medium has been recorded through the first route not performing duplication number management on the main information or through the second route performing duplication number management on the main information.

If the main information has been recorded through the second route, and is deleted as it is returned to the source device, it is checked, based on the statement of the portion of the management information of the recording area different depending on the duplication route and on the duplication hysteresis information, whether or not the main information is that supplied from the source device. If it is found that the main information deleted from the recording medium is the main information from the source device, the number of times of possible duplication of the fraction of the main information deleted from the recording medium is returned to the source device to enable further duplication of the main information from the supply device.

That is, the system of supervising the number of duplicates of audio data, as a system of the copyright protection technique, prepared by SDMI, can be applied to the case of employing e.g., a mini-disc having both a main information area and a management information area as a recording medium.

In the duplication management method of the present invention, the portion of the management information, the statement of which is to be differentiated, is the time information for time of recording the main information on the recording medium, to differentiate the time of recording the main information on the recording medium, that is the recording time information, between the case of recording the main information through the first route and that of recording the main information through the second route. In this manner, it can be clearly discriminated, using the recording time information recorded in the management area of the recording medium in association with the main information when the main information is recorded on the recording medium, whether the main information has been recorded through the first route or through the second route. Moreover, from the statement of the recording time information, it can be determined whether or not the recording medium in question is the recording medium to which the main information has been furnished from a preset supply source.

The portion of the management information, the statement of which is to be differentiated, may be an equipment identifier of a recording equipment used in recording the main information on the recording medium. That is, the equipment identifier of a recording equipment used in recording the main information on the recording medium is differentiated between the case of recording the main information on the recording medium through the first route and that of recording the main information on the recording medium through the second route. Thus, even if the main information has been recorded using the same recording device, it can be clearly determined whether the main information has been recorded through the first route or through the second route, with the aid of the equipment identifier recorded in the management area of the recording medium in recording the main information on the recording medium. Moreover, it can be determined, based on the description of the equipment identifier, whether or not the recording medium in question is the recording medium supplied with the main information from a preset supply source.

In the duplication management method of the present invention, one of an even number and an odd number is allocated to a preset digit of the time information for the main information recorded through the first route on the recording medium and the other of the even number and the odd number is allocated to a preset digit of the time information for the main information recorded through the second route on the recording medium to differentiate the statement of the time information.

With this duplication management method, the preset digit of the recording time information for the main information recorded through the first route on the recording medium is necessarily an even number, while the preset digit of the recording time information for the main information recorded through the second route on the recording medium is necessarily an odd number. Alternatively, the preset digit of the recording time information for the main information recorded through the first route on the recording medium is necessarily an odd number, while the preset digit of the recording time information for the main information recorded through the second route on the recording medium is necessarily an even number.

By so doing, it can be clearly determined, depending on whether the recording time information recorded in the management area of the recording medium in association with the main information when recording the main information on the recording medium is an odd number or an even number, whether the main information has been recorded through the first route or through the second route.

Additionally, with the duplication management method of the present invention, a preset fixed value is allocated to a preset digit of the time information for the main information recorded through the first route on the recording medium, and a fixed value except the preset fixed value is allocated to a preset digit of the time information for the main information recorded through the second route on the recording medium, to differentiate the statement of the time information. With this duplication management method, the preset digit of the recording time information associated with the main information recorded through the first route on the recording medium is necessarily 0 (zero), while that associated with the main information recorded through the second route on the recording medium is necessarily a value other than 0 (zero).

By so doing, it can be clearly determined, using the recording time information recorded in the management area of the recording medium in association with the main information recorded on the recording medium, whether the main information has been recorded through the first route or through the second route.

Moreover, with the duplication management method of the present invention, the duplication hysteresis information includes not only the time information but also the equipment identifier for an equipment, which has made the duplication, in which the equipment identifier is included in the management information. With this duplication management method, the equipment identifier of the equipment which has made the duplication, as the management information recorded in the management area, is included in the duplication hysteresis information.

In this manner, it can be determined, based on the time information, whether the main information recorded on the recording medium is the information recorded through the first route or through the second route, while it can be determined, from the equipment identifier included in the management information and from the equipment identifier of the duplication hysteresis information, whether or not the main information recorded on the recording medium has been sent from a specified supply source.

The present invention also provides a duplication management system comprising a recording device for duplicating the main information to a recording medium having a main information area in which the main information is recorded and a management area in which the management information for each item of the main information recorded in the main information area is recorded, and a management device for controlling and supervising duplication by the recording device, in which the recording device includes a first route for duplicating the main information without performing duplication number management, a second route for duplicating the main information with duplication number management, and management information recording means for recording the management information in the management area of the recording medium. The statement of a portion of the management information differs between the case of duplicating the main information through the first route and the case of duplicating the main information through the second route. The management device includes duplication hysteresis information storage means for storing and holding the portion of the management information recorded in the management area at least in case the main information is duplicated to the recording medium through the second route.

The present invention also provides a duplication management apparatus comprising first inputting means for receiving encrypted first digital signals, second inputting means for receiving non-encrypted second digital signals, decoding means for decrypting the first digital signals sent from the first inputting means, switching means for selecting the first digital signals decoded by the decoding means or the second digital signals sent from the second inputting means, and recording means for recording the digital signals selected by the switching means on a main information recording area on the recording medium and for recording in a management area on the recording medium an identifier for discriminating whether the digital signals recorded in the main information recording area are the first digital signals or the second digital signals.

Other objects, features and advantages of the present invention will become more apparent from reading the embodiments of the present invention as shown in the drawings.

BRIEF DESCRIPTION OF THE DRAWINGS

FIGS. 14A and 14B are flowcharts continuing to FIGS. 13A and 13B, respectively.

BEST MODE FOR CARRYING OUT THE INVENTION

Figure 1:
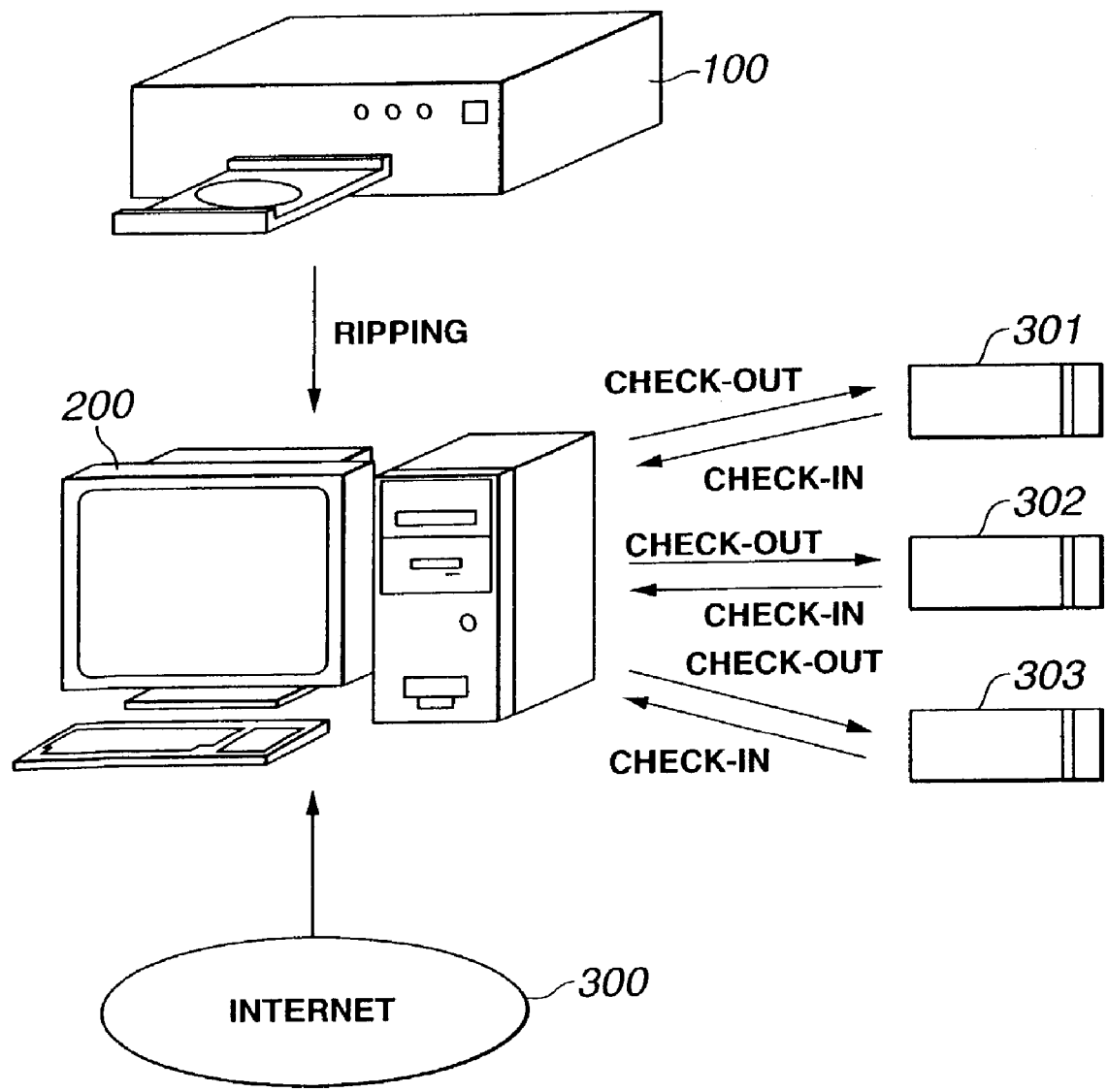
FIG. 1 is a block diagram for illustrating an instance of a system which performs control on the number of possible duplicates.

Referring to the drawings, preferred embodiments of the duplication management method, duplication management system, recording device and the duplication management device according to the present invention will be explained in detail. The following explanation is directed to a case where the duplication management method, duplication management system, recording device and the duplication management device, according to the present invention, are applied to an audio recording and/or reproducing system, in which the audio data is processed as the main information.

[Audio Recording and/or Reproducing System]

Figure 2:
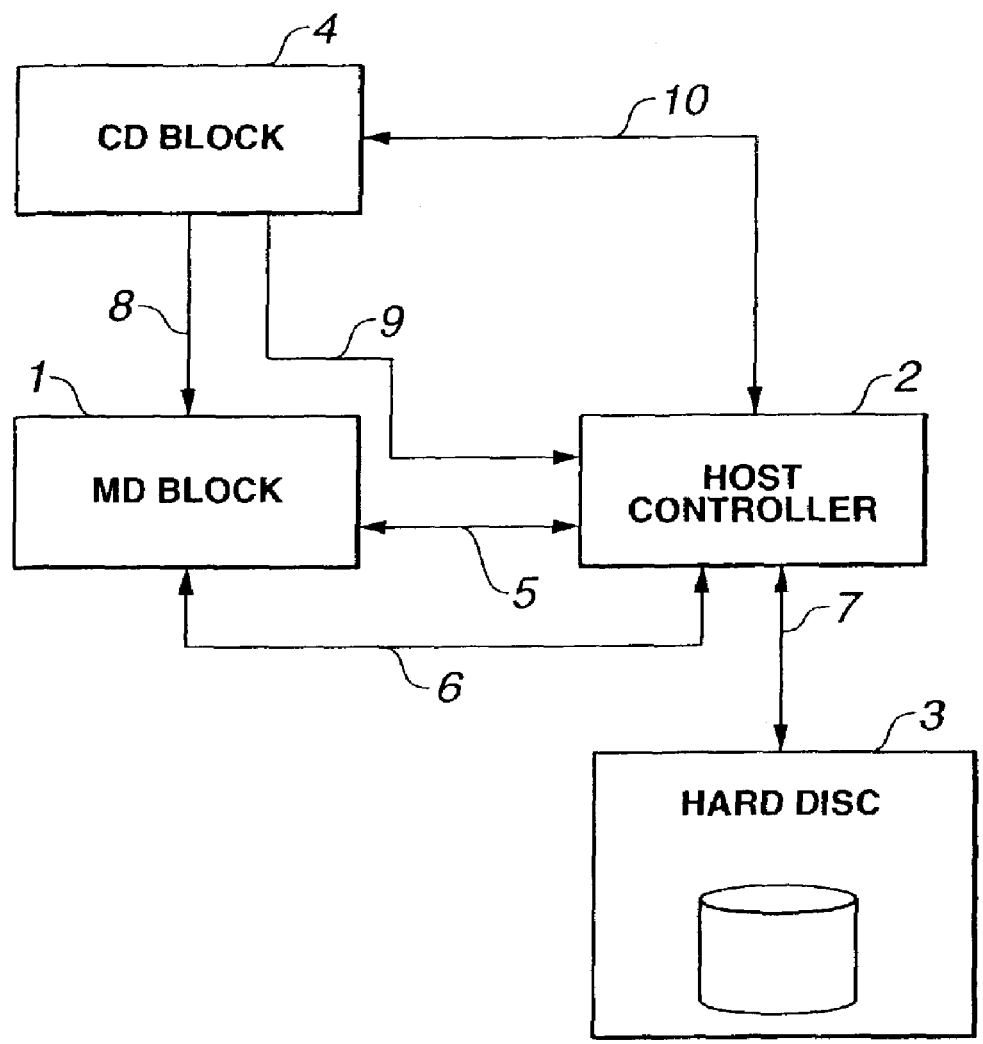
FIG. 2 is a block diagram showing an audio recording and/or reproducing system to which an embodiment of the duplication management system according to the present invention is applied.
Figure 3:
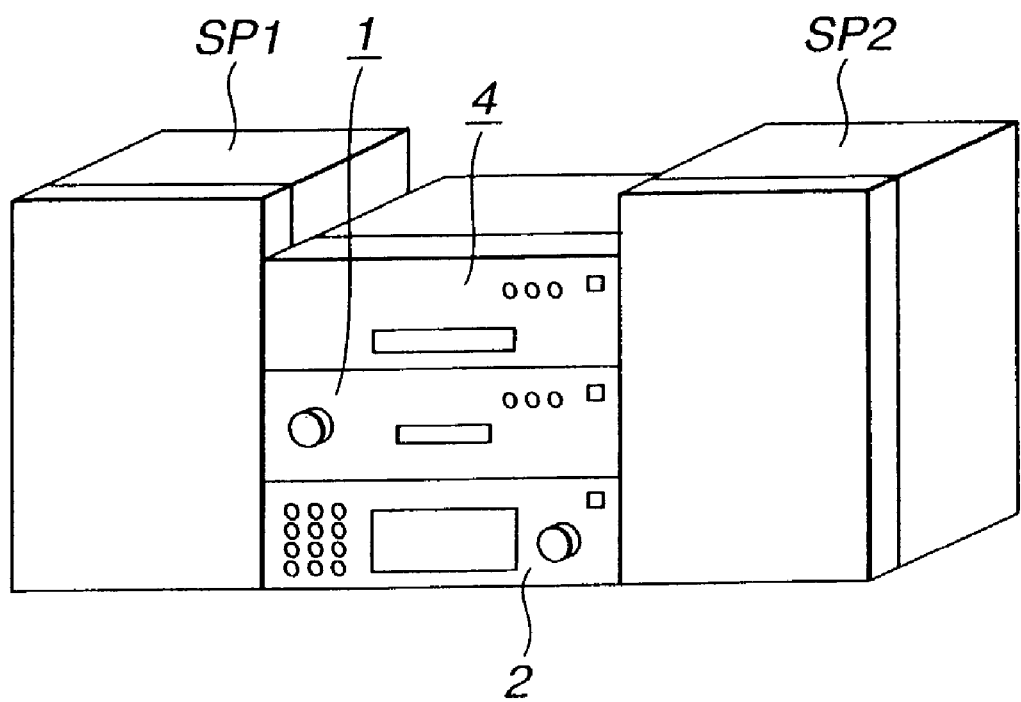
FIG. 3 shows the appearance of the audio recording and/or reproducing system shown in FIG. 2.

FIG. 2 is a block diagram for illustrating the structure of an audio recording and/or reproducing system, to which the duplication management method and system according to the present invention are applied, and FIG. 3 shows the appearance of the audio recording and/or reproducing system of the present embodiment.

Referring to FIG. 2, the audio recording and/or reproducing unit according to the present invention includes a MD block 1, having the function of a recording and/or reproducing device for a mini-disc (MD), a host controller 2, a hard disc device 3, and a CD block 4, having the function of a reproducing device for a compact disc (CD).

The audio recording and/or reproducing system, shown in FIG. 2, is of the so-called standstill type, as shown in FIG. 3, and may be comprised of, for example, the MD block 1, host controller 2 and the CD block 4, stacked together. Meanwhile, in the present embodiment, the hard disc device 3 is housed within the host controller 2. The host controller 2 is provided with connection terminals for loudspeakers SP1, SP2 for connection to these loudspeakers SP1, SP2.

Referring to FIG. 2, the MD block 1 and the host controller 2 are interconnected over a data transmission channel 5 and a system-to-system communication channel 6. The data transmission channel 5 is used for synchronous serial transmission and is capable of reciprocally transmitting data (audio data) by changing over the communication direction. The system-to-system communication channel 6 serves for reciprocal command transmission between the MD block 1 and the host controller 2.

The data transmission channel 5 and the system-to-system communication channel 6 may be a sole common line such as IEEE1394 or USB (universal serial bus).

The host controller 2 and the hard disc device 3 are interconnected over a system bus 7. Over this system bus 7, reciprocal transmission of commands and data may be made between the host controller 2 and a controller of the hard disc device 3. The data recorded on the hard disc device 3 is managed by a file system such as FAT32 (File Allocation table 32).

The CD block 4 is connected to the MD block 1 over a data transmission channel 8, while being connected to the host controller 2 over a data transmission channel 9 and a system-to-system communication channel 10. The data transmission channel 8 serves for transmitting audio data from the CD block 4 to the MD block 1 and may for example be an optical cable conforming to the IEC 958 (International Electro-Technical Commission) standard.

The data transmission channel 9 serves for sending audio data from the CD block 4 to the host controller 2. This enables the CD block 4 to send audio data over the data transmission channel 9 and through the host controller 2 to the hard disc device 3. The system-to-system communication channel 10 serves for reciprocally transmitting commands between the CD block 4 and the host controller 2.

The data transmission channel 9 and the system-to-system communication channel 10 may be a sole common line such as IEEE1394 or USB (universal serial bus).

The host controller 2, which is able to control the respective blocks making up the audio recording and/or reproducing system of the present embodiment, has the function as a so-called audio amplifier, and is supplied with the audio data from the MD block 1, hard disc device 3 and the CD block 4 to form audio signals for outputting from the audio data to adjust the sound quality and volume of the audio signals to output the so adjusted audio signals to the loudspeakers SP1, SP2.

The MD block 1 is supplied through the host controller 2 with encrypted compressed audio data, stored in a hard disc of the hard disc device 3, to record encrypted compressed audio data on a mini-disc loaded on the MD block 1 as decrypted compressed audio data by way of duplication. The MD block 1 is also supplied from the CD block 4 with non-encrypted PCM audio data to record the non-encrypted PCM audio data on a mini-disc loaded on the MD block 1 as compressed audio data by way of duplication.

On the hard disc device 3, audio data from the MD block 1 or audio data from the CD block 4 can be recorded through the host controller 2. Although not shown, a personal computer, for example, can be connected to the host controller 2, which is then supplied with audio data taken into the personal computer over the Internet to record the audio data in the hard disc of the hard disc device 3.

Thus, in the audio recording and/or reproducing unit according to the present invention, the hard disc device 3 is able to record audio data supplied from the MD block 1, CD block 4 or an external equipment, such as a personal computer, on the own hard disc, and to manage the data in cooperation with the host controller 2, in a manner which will be explained subsequently.

Moreover, with the audio recording and/or reproducing system of the present invention, the MD block 1 compresses the encrypted compressed audio data, supplied from the hard disc device 3 through the host controller 2, or the PCM audio data supplied from the CD block 4, for duplicating the resulting data on a mini-disc loaded thereon.

In this case, the channel over which the MD block 1 duplicates the audio data from the CD block 4 on the mini-disc loaded thereon is a first channel, typified by a conventional optical cable conforming to for example the IEC 958 standard, such that duplication can be made as conventionally for personal use. On the first channel, represented by the optical cable conforming to the IEC 958 standard, there are transmitted non-encrypted compressed digital audio signals.

The channel of duplication by the MD block 1 of audio data from the hard disc device 3 through the host controller 2 on the mini-disc loaded thereon is a second channel or new channel represented for example by IEEE1394 or USB. If audio data is to be duplicated over a second channel, in this audio recording and/or reproducing system, the ND block 1 and the host controller 2 cooperate with each other to perform management of the plural number (limitation) of duplicates of the audio data stored in the hard disc device 3 to the mini-disc. On the second channel, represented by the IEEE1394 or USB, there are transmitted encrypted compressed digital audio signals.

That is, in duplicating the audio data from the hard disc device 3 to the MD block 1, the system of managing the number of duplicates of the audio data (limitation) as a system of the copyright protection technique prepared by the SDMI is applied. The copyright protection system of performing duplicate number management (limitation) of the audio data prepared by the SDMI is accompanied by the check-out and check-in operations, as described above.

The check-out operation in the present embodiment is the operation of supplying the audio data stored in the hard disc of the hard disc device 3 to the MD block 1 through the host controller 2 for duplicating the data on a mini-disc loaded on the MD block 1. At this time, the number of audio data duplicates on the mini-discs is managed by the host controller 2.

That is, the host controller 2 performs management as to which audio data has been output to which mini-disc, and allows only up to three duplicates to be prepared for such audio data, as will also be explained subsequently. Although it is possible to perform control so that the checked-out audio data cannot be reproduced on the originating equipment, the present embodiment is directed to the case of limiting the number of duplicates, as an example.

The check-in operation in the present embodiment is the operation of deleting the audio data supplied from the hard disc device 3 through the host controller 2 and duplicated on a mini-disc, from the mini-disc, as by returning the data through the host controller 2 to the hard disc of the hard disc device 3. Since the audio data duplicated by the check-out to the mini-disc is deleted, the number of duplicates is decreased and duplication is allowed for the audio data so as to eke out the decreased number.

This gives rise to constraint is such that, when a check-out is made for one audio data (one music air) recorded on the hard disc of the hard disc device 3, the audio data cannot be reproduced, or the number of times of possible checkout for the audio data is decreased, such that, after a preset number of times of checkout, checkout is no longer allowed.

By performing the check-in for the audio data as described above, the constraint for the audio data is removed. It should be noted that the check-in operation may be made only for the checked-out relevant audio data of the mini-disc. That is, only the audio data checked-out by the MD block 1 through the host controller 2 and duplicated on the mini-disc can be checked-in to the hard disc device 3 through the host controller 2.

Thus, in the audio recording and/or reproducing system of the present embodiment, the audio data recorded on the mini-disc can be discriminated as to whether or not these audio data have been checked out, that is duplicated over the second channel, while the host controller 2 is able to manage the information relevant to the checked-out audio data to effectuate the check-in operation, as described above and also as will be explained in detail subsequently.

[MD Block 1]

Figure 4:
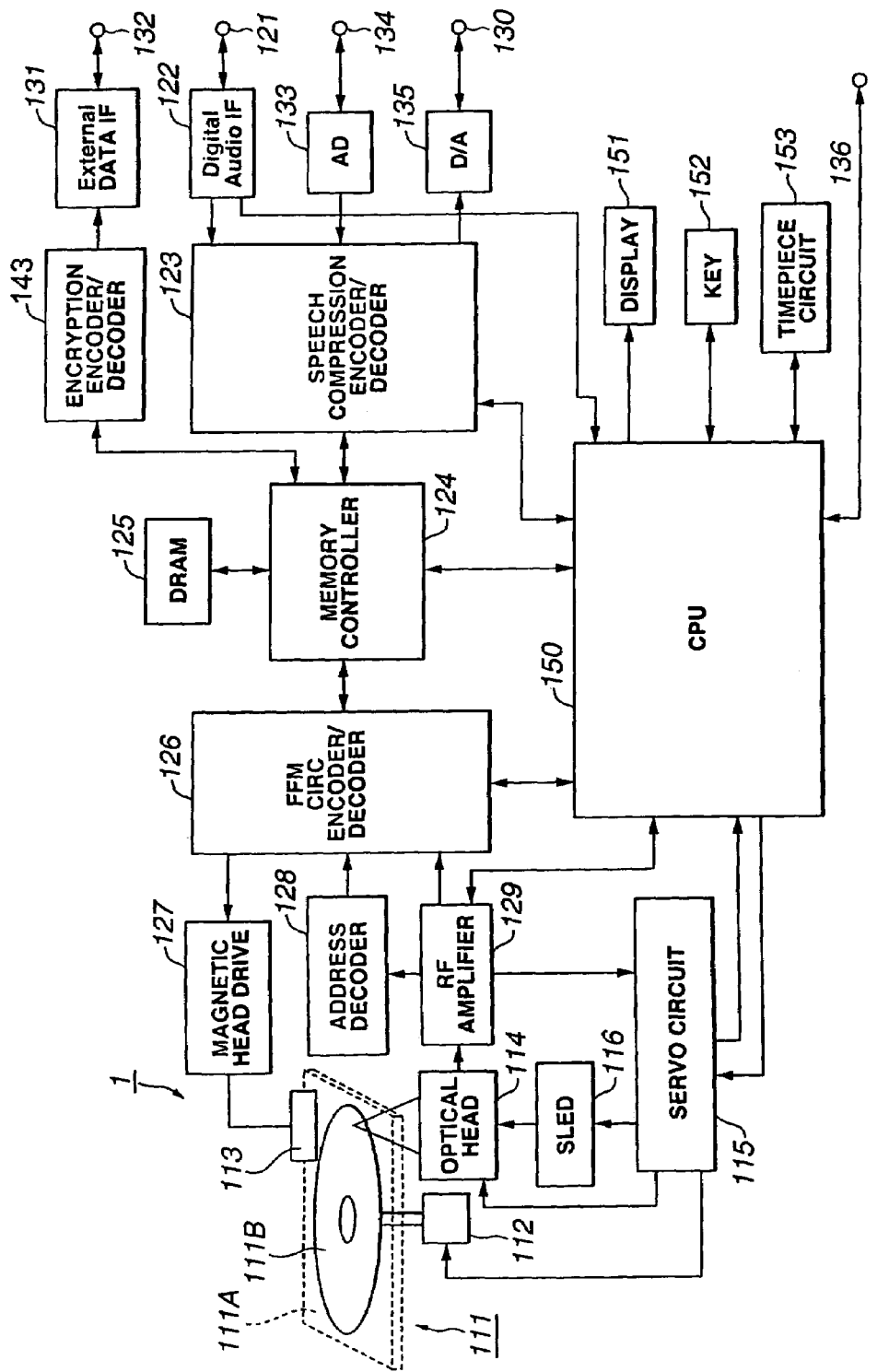
FIG. 4 is a block diagram for illustrating a MD block shown in FIG. 2.

The MD block 1 of the audio recording and/or reproducing system of the present embodiment is hereinafter explained. FIG. 4 shows, in a block diagram, the MD block 1 of the audio recording and/or reproducing system of the present embodiment. In FIG. 4, 111 denotes a mini-disc. The mini-disc 111 is formed by housing a disc 111B, 64 mm in diameter, in a cartridge 111A. As this mini-disc 111, any of three types, that is a replay-only optical disc, a recordable magneto-optical disc or a hybrid disc enabling a replay-only area and a recordable area, may be used.

The disc 111B of the mini-disc 111 is run in rotation by a spindle motor 112. The mini-disc 111 is provided with a shutter, which is opened on loading the mini-disc 111. If the recording and/or reproducing device is designed for a recordable magneto-optical disc, a recording magnetic head 113 is mounted facing the upper side of the disc 111B and an optical head 114 is mounted facing the lower side of the disc 111B.

When the reproducing device is designed for a replay-only optical disc, the magnetic head 113 is not provided and the optical head 114 is provided on the lower side of the disc 111B. The MD block 1 shown in FIG. 3 is used for a recording and/or reproducing device which is able to use a recordable magneto-optical disc (mini-disc).

The rotation of the spindle motor 112 is controlled by a servo control circuit 115. The optical head 114 is controlled in its movement radially of the disc 111B by a feed motor (sled motor) 116. The servo control circuit 115 effectuates focussing control and tracking control, based on focussing error signals and tracking error signals from an RF amplifier 129.

A system controller 150 manages the overall operations of the MD block 1. The system controller 150 is supplied with an input from a key operating unit 152, which key operating unit 152 includes a power supply key, an ejection key, a replay key, a pause key, a stop key, a select key and a recording key. An input is also applied from a remote controller receipt unit, not shown. The commands applied from the remote controller include a power supply command, an ejection command, a replay command, a pause command, a stop command, a select command (track specifying and reproducing command) and a recording command.

A display unit 151 is comprised of, for example, a LCD (liquid crystal display). On the display surface of the display unit 151, there are displayed the time information, such as the total playing time of the loaded mini-disc, time elapsed since start of a number being played, remaining play time of the number being played, or the remaining playing time of the entire disc, or the track number of the music air being played. In the disc which records the disc name or the track name, the disc name or the track name is demonstrated. Moreover, if the recording time and date (recording time point) of the disc or the music air is recorded, the recording time and date is displayed.

First, the recording processing is explained. Referring to FIG. 4, the MD block 1 is provided with two input terminals, one of which is a digital input terminal 121 and the other of which is an analog input terminal 134. The digital audio data from e.g., a digital output terminal of the CD block 4 is sent through the digital input terminal 121 to a digital audio interface 122.

The digital audio interface 122 is formed y an optical cable, conforming to the IEC 958 format, and is used for transmitting linear PCM digital audio data, output from a digital output terminal of the CD block 4 and which were sampled at 44.1 kHz with the number of quantization bits equal to 16.

The digital audio interface 122 separates the linear PCM digital audio data, supplied thereto, into audio data and the other information. The other information includes the information termed Cbit and Ubit, and is read by the system controller 150. The separated audio data is sent to a speech compression encoder/decoder 123 so as to be thereby encoded into compressed digital audio signals.

The analog output from the CD block 4 and the analog audio signals from a tuner of a radio receiver or a cassette tape recorder are sent through an analog audio input terminal 134 to an A/D converter 133. The A/D converter 133 converts the analog audio signals, supplied thereto, into digital data at a sampling frequency of 44.1 kHz and with the number of quantization bits of 16. The digitized audio data is input to the speech compression encoder/decoder 123.

The speech compression encoder/decoder 123 compresses the audio data, supplied thereto, to a data volume of approximately one-fifth. The compression technique for the audio signals may be exemplified by ATRAC (Adaptive Transform Acoustic Coding) employing the modified DCT (Discrete Cosine Transform) and ATRAC3 with a higher compression factor. Meanwhile, ATRAC and ATRAC3 are speech compression techniques developed by the SONY CORPORATION, the present Assignee.

The audio data, compressed in the speech compression encoder/decoder 123, is transiently stored through a memory controller 124 in a DRAM 125, which DRAM 125 has a data capacity not less than one cluster (16 megabits in the present instance). The output of this DRAM 125 is sent to an encoder/decoder 126 of EFM and CIRC.

It should be noted that the EFM is an acronym for eight to fourteen modulation (8.14 modulation) and CIRC is an acronym for cross interleave Reed Solomon code which is a sort of the error correction code.

The encoder/decoder 126 of EFM and CIRC appends an error correction code, here the CIRC, to the audio data output from the DRAM 125, to modulate the audio data, having the error correction code appended thereto, with EFM (8.14 modulation).

The audio data for recording thus formed, is sent through a magnetic head driving circuit 127 to a recording magnetic head 113. The magnetic field, modulated with the recording data, is applied to a disc 111B (magneto-optical disc) of the mini-disc 111. The light beam from the optical head 114 is illuminated on the disc 111B of the mini-disc 111. This photo-magnetically records data on the disc 111B of the mini-disc 111.

Meanwhile, data recording is on the cluster-by-cluster basis. One cluster of made up by 36 sectors, with each sector corresponding to one sub-code block of the compact disc is 5.5 sound groups. In actual one cluster, 32 sectors are valid sectors. The remaining four sectors are used as linking area in order to match the timing to the rise of the magnetic field of the magnetic head in starting the recording or to the controlling of the laser power.

The location on the disc 111B during recording is specified by an address recorded as wobbles in a groove formed along a track on the disc 111B. This address is detected by an address decoder 128. The address detected by the address decoder 128 is sent to the encoder/decoder 126 operating under EFM and CIRC. During recording, the information is written in the UTOC which will be explained subsequently.

The processing in replay is explained. In replay, a light beam is illuminated from the optical head 114 to the disc 111B run in rotation by the spindle motor 112. The reflected light of the light beam from the disc 111B is received by a light receiving element (photodetector) provided on the optical head 114 and converted into electrical signals which are supplied to an RF amplifier 129.

In the present embodiment, the RF amplifier 129 includes a replay RF signal forming unit, a focussing error signal forming unit, a tracking error signal forming unit and so forth. The replay RF signals, formed by the replay RF signal forming unit of the RF amplifier 129, are sent to the encoder/decoder 126 operating under EFM and CIRC.

The focussing error signals formed by the focussing error signal forming unit of the RF amplifier 129 and the tracking error signals formed by the tracking error signal forming unit are sent to the servo control circuit 115 so as to be used for focussing control and tracking control by the servo control circuit 115, as explained previously.

The encoder/decoder 126 operating under EFM and CIRC EFM-demodulates the replay RF signals (audio data) supplied from the RF amplifier 129, while performing error correction processing. The audio data, demodulated and corrected for errors by the encoder/decoder 126 operating under EFM and CIRC are transiently stored in the in the DRAM 125 through memory controller 124. An output of the DRAM 125 is sent to the speech compression encoder/decoder 123.

Meanwhile, the time needed for reading-in data to the full capacity of the DRAM 125 is approximately 12 sec, this data corresponding to audio data with the replay time of approximately 50 sec. That is, if the data is stored to the full capacity of the DRAM 125, and it becomes impossible to read out signals from the disc 111B, the replay signals can be continuously output for approximately 50 seconds. During such time, the light beam from the optical head 114 is illuminated to an original position for re-accessing in order to effectuate signal readout again to prevent sound skipping from occurring.

The speech compression encoder/decoder 123 performs companion of compressed audio data from the DRAM 125. The audio data, decompressed by the speech compression encoder/decoder 123, is sent to the D/A converter 135 so as to be re-converted to analog signals.

These analog audio signals are output from an analog output terminal 130. The system controller 150 is able to read out sound volume data at such time. The sound volume data as read out may be a peak value as from the time of previous readout until the current readout.

The memory controller 124 is able to input/output data to or from an external system via an external data input/output terminal 132 and an external data interface 131. The input data from the external data input/output terminal 132 is stored in the DRAM 125 through the external data interface 131 and the memory controller 124.

Conversely, the data on the DRAM 125 can be output to the external data input/output terminal 132 through the memory controller 124 and the external data interface 131. The switching of the input/output operation is executed by the system controller 150.

The synchronization with an external system, such as host controller 2, is achieved by communication over a control communication channel 136 with the external system. The control communication channel 136 is the system-to-system communication channel 6 of FIG. 2, as seen from the inside of the MD block 1.

In the present embodiment, the host controller 2 is adapted to be connected to the external data input/output terminal 132. The compressed encrypted audio data may be transmitted/received over the host controller 2 between the MD block 1 and the hard disc device 3.

The compressed audio data may be supplied from the host controller 2 or other external system to the disc 111B of the mini-disc 111, through the external data interface 131, so as to be recorded thereon. The compressed encrypted audio data, input from the external data input/output terminal 132, is encrypted by a cipher encoder/decoder 143 so as to be stored as compressed digital audio data in the DRAM 125.

If the system controller 150 has determined that a sufficient quantity of the digital audio data for recording on the disc 111B has been stored in the DRAM 125, the system controller 150 outputs the digital audio data 10 record data, such as audio data, in the DRAM 125 through the encoder/decoder 126 operating under EFM and CIRC, magnetic head driving circuit 127 and the magnetic head 113 to the disc 111B.

If the audio data from the external data input/output terminal 132 is of the same form as that of the encoded data output by the speech compression encoder/decoder 123, the audio data is recorded as the music track. The registration is by the UTOC which will be explained subsequently.

On the innermost portion of the disc 111B of the mini-disc 111, there is provided the TOC (Table of Contents). In the TOC are written the start address and the end address of each number of the disc, the track name as the name of the number, and the disc name as the name of the mini-disc.

On the disc 111B of the mini-disc 111, there is also provided a UTOC (user TOC) for the user to manage the recorded audio disc. There are plural sorts of the UTOC, such as sector 0, sector 1 and sector 2, depending on the application.

Thus, there are occasions where the disc 111B of the mini-disc 111 is provided with a main information area for recording the main information, such as audio data, and a management area, in which to record the TOC or the UTOC. With the MD block 1, in duplicating the audio data, portions of the management information of the UTOC corresponding to the duplicated audio data are differentiated between the case of duplicating the audio data over the first channel not performing duplicate number management and the case of duplicating the audio data over the second channel performing the duplicate number management.

In the present embodiment the first channel is the channel which interconnects the CD block 4 and the MD block 1 and over which the MD block 1 duplicates the audio data from the CD block 4 on the mini-disc without the MD block 1 performing duplicate number management, as described above. On the other hand, the second channel is the channel which interconnects the host controller 2 and the MD block 1 and over which the MD block 1 receives the audio data from the host controller 2 through the host controller 2 to duplicate the so received audio data on the mini-disc as the MD block 1 performs the number management.

The sectors 0, 1 and 2 of the UTOC, recorded on the disc 111B of the mini-disc 111, are specifically explained, and the portions of the UTOC management information, which are differentiated between the case in which the MD block 1 duplicates the audio data over the first channel and the case in which the MD block 1 duplicates the audio data over the second channel, are clarified.

[UTOC Sector 0]

Figure 5:
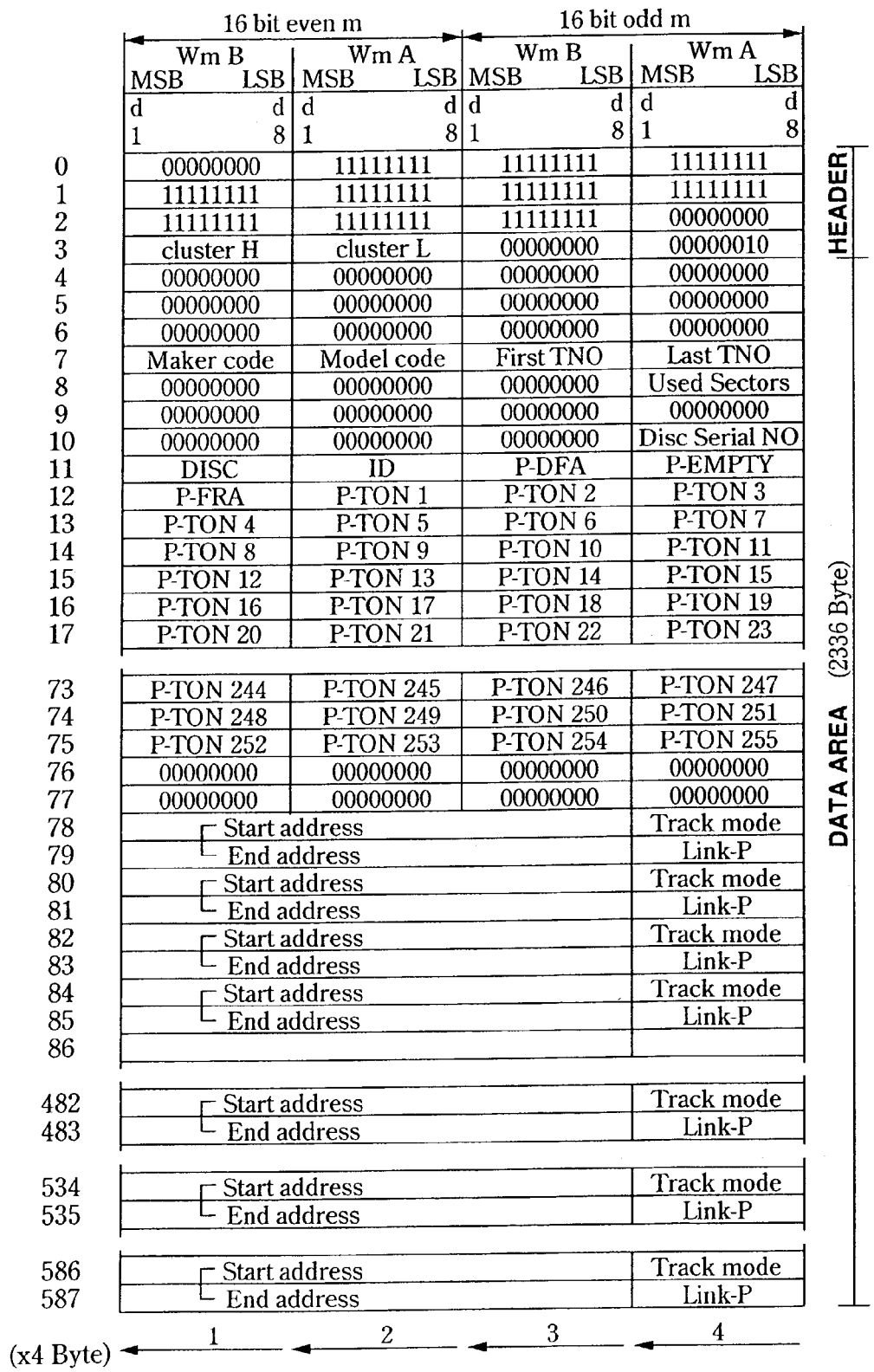
FIG. 5 illustrates a UTOC sector 0 recorded on a mini-disc.

FIG. 5 illustrates the structure of the sector 0 of the UTOC. The UTOC sector 0 is roughly divided into a leading header of 16 bytes and a data area of the next following 2336 bytes. This UTOC sector 0 sets forth the recording state relevant to a disc, here the disc 111B.

Thus, in duplicating (recording) the music air on the disc 111B, the system controller 150 finds out a void area on the disc 111B, from the information of the UTOC sector 0, to record the audio data in the so found out void area. In replay, the system controller 150 discriminates the area in which the audio data to be reproduced is recorded and accesses the area to reproduce the target audio data from the so found out area.

The UTOC sector 0 is now specifically explained. In FIG. 5, the numbers of 0, 1, 2, 3, . . . on the left end denote positions of areas each four byte long. In the 4-byte group indicated by the left end figure '7', the first byte denoting the maker code and the second byte denoting the model code respectively record a maker code specifying the manufacturer of the equipment which recorded the UTOC and the model code specifying the equipment type. This maker code and the model code are designed to be recorded at the outset in for example a ROM in the system controller of each recording equipment and in each recording and/or reproducing equipment.

In the second byte P.TN01 of the second byte of the 4-byte group indicated by the left end numerical figure '12' in FIG. 5, there is written a pointer on the UTOC sector for an address from which the first music air commences. That is, if '1' has been entered in P.TNO1, the start and end addresses are written with the number #(76+1*2)*4 byte of the sector 0 as the leading end.

Since the number #(76+1*2)*4=number#78*4 byte, the address indicating the recording start position of the first music air is recorded as from the leading end of a position indicated by the left end number '78' in FIG. 5. For P.TNO2 ff., the positions on the UTOC sector 0 of the recording start and end addresses on the disc 111B of the number #n music air can be found by $$(76+(P.TNO(n))*2)*4 \tag{1}$$

In the above equation (1), the symbol '*' stands for multiplication, and n is an integer not less than unity. The P.TNO(n) denotes the value of the number #n P.TNO.

The fourth four-byte P.EMPTY indicated by the left end numerical figure '11' in FIG. 5 indicates the leading end parts-table on unused parts-tables in the UTOC sector 0. Meanwhile, the parts-table means an 8-byte area, downstream of the left end numerical figure '78' in FIG. 5, where start and end addresses are recorded.

In FIG. 5, the first byte P.FRA of the four-byte group indicated by the left end numerical figure '12' indicates a void area on the disc 111B where data can be written, and specifies the leading one of parts-tables in which are recorded address data specifying void areas.

If there is a void area in the disc 111B in which can be recorded main data, a numerical value specifying a parts-table is recorded in P.FRA. In the parts table specified depending on the value of P.FRA, there are recorded start and end addresses of the void area. If there are plural void areas, the parts-table which has recorded the start and end address of the next void area is specified by the Link.P information of the parts table. In this manner, the void area can be managed sequentially in accordance with a so-called link configuration.

In FIG. 5, the third byte 'P.DFA' of the four-byte group specified by the left end numerical figure '11' is relevant to a defective area of the disc 111B and, specifically, denotes the leading one of the parts-tables in which is recorded the address data specifying the defective area.

Thus, in the same way as in the void area by the aforementioned P.FRA, a numerical value indicating the parts-table is recorded in P.DFA if there exists the defective area on the disc 111B, while the start and end addresses of the defective area are recorded in the parts table specified by the numerical value of the P.DFA. When there are plural defective areas, the parts table where the start and end addresses of the next defective area is specified by the Link.P information of the parts-table. That is, the defective areas can be managed by the so-called link configuration.

The Track mode, making up the parts table, is made up by eight bits, of which the bit d8, as LSB, the bit d7, the bit d4 and the bit d2 set an emphasis on/off flag, a monaural/stereo flag, an audio/non-audio flag and a copy inhibit flag, respectively.

[UTOC Sector 1]

Figure 6:
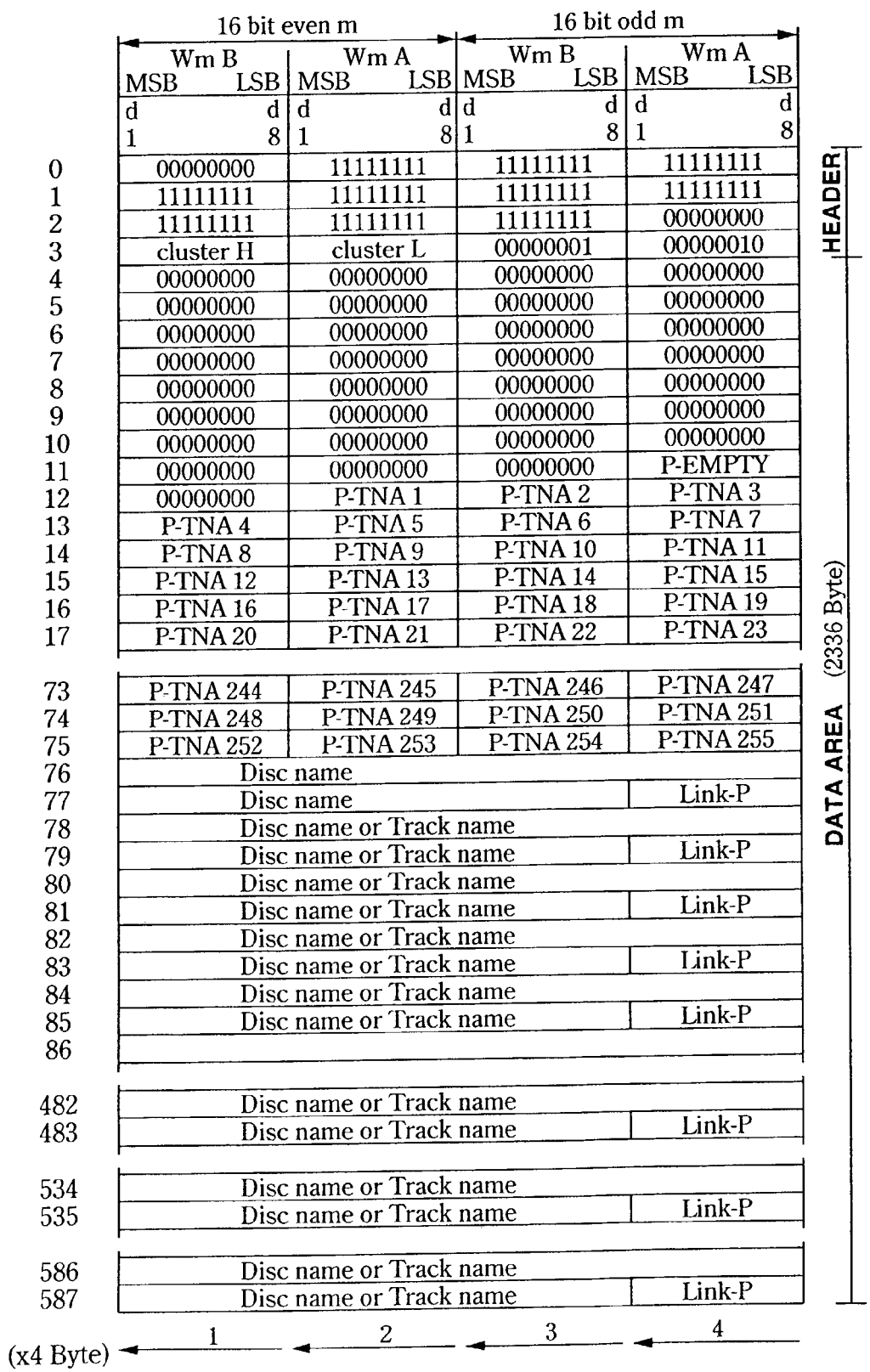
FIG. 6 illustrates a UTOC sector 1 recorded on a mini-disc.

FIG. 6 illustrates the structure of the sector 1 of the UTOC. Ths UTOC sector 1 is roughly divided into a leading header of 16 bytes and a data area of the next following 2336 bytes. This UTOC sector 1 holds the information on the disc name and the track name in the ASCII code. In FIG. 6, the numbers of 0, 1, 2, 3, . . . on the left end denote positions of areas each four byte long.

In FIG. 6, the second byte P.TNA1 of the four byte group indicated by the left end numerical figure '12' specifies an address on the UTOC sector 1 where there is entered the track name of the first music air. That is, if P.TNA1 is 2, the track name of the first musical air is entered beginning from the byte number #(76+2*2)*4 of the sector 1 as the leading end. Since (76+2*2)*4=80*4, the track name of the first musical air is recorded as from the leading end of the position specified by the left end numerical figure '80' in FIG. 6.

The same holds for P.TNO2 ff., such that $$(76+(P.TNA(n))*2)*4 \qquad (2)$$

indicates the position on the UTOC sector 1 where the number #n track name is entered In the above equation (2), the symbol '*' stands for multiplication, and n is an integer not less than unity. The P.TNA(n) denotes the value of the number #n P.TNA. Meanwhile, the disc name is recorded with the number #76*4 byte of the UTOC sector 1 as the leading end, as shown in FIG. 6.

[UTOC Sector 2]

Figure 7:
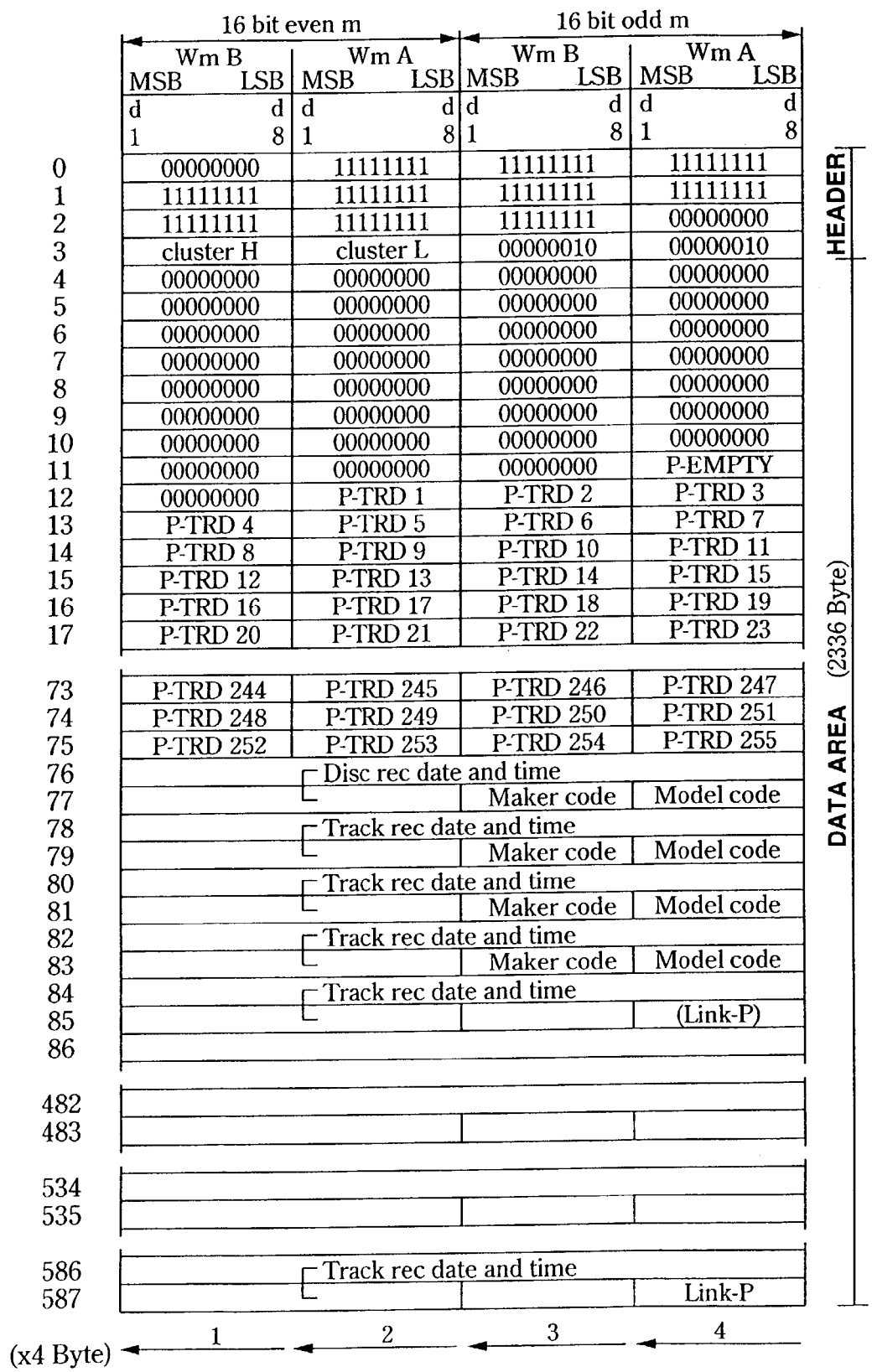
FIG. 7 illustrates a UTOC sector 2 recorded on a mini-disc.

FIG. 7 illustrates the structure of the sector 2 of the UTOC. Ths UTOC sector 2 is roughly divided into a leading header of 16 bytes and a data area of the next following 2336 bytes. In FIG. 7, the numbers of 0, 1, 2, 3, . . . on the left end denote positions of areas each four byte long.

The UTOC sector 2 records the recording date and time of audio data recorded on the disc. In the associated mini-disc recorder, the recording date and time is recorded automatically simultaneously with recording. In the present embodiment of the MD block 1, the recording date and time are furnished from the timing circuit 153 shown in FIG. 3. The timing circuit of the MD block 1 has the so-called calendar function and is able to furnish the current time, current day of the week, current date and month of the year and the current year.

In FIG. 7, the second byte P.TRD1 of the four byte group indicated by the left end numerical figure '12' specifies a leading address on the UTOC sector 2 where there is entered the date and time of recording of the first music air. That is, if P.TNA1 is 3, the recording time and date of the first musical air is entered beginning from the byte number #(76+3*2)*4 of the UTOC sector 2 as the leading end. Since (76+3*2)*4=82*4, the recording time and date of the first musical air is recorded as from the leading end of the position specified by the left end numerical figure '82' in FIG. 7.

The same holds for P.TRD2 ff., such that $$(76+(P.TRD(n))*2)*4 \qquad (3)$$

indicates the position on the UTOC sector 2 where the number #n recording time and date is entered.

In the above equation (3), the symbol '*' stands for multiplication, and n is an integer not less than unity. The P.TRD(n) denotes the value of the number #n P.TRD. Meanwhile, the recording time and date of the disc is recorded with the number #76*4 byte of the sector 2 as the leading end.

In addition, in the UTOC sector 2 the codes identifying the maker of the device which has recorded the track and the model (maker code and model code) are recorded, as shown in FIG. 7. For example, if P.TRD is 3, the code for identifying the maker (maker code) and the code for identifying the model are recorded at the number #(76+3*2)*4+6 byte and at the number #(76+3*2)*4+7 byte of the UTOC sector 2, respectively.

Meanwhile, the information Link.P is included in the information of each track of the UTOC sectors 0 and 1, as shown in FIG. 5 and 6. This Link.P indicates, in the sector 0, to which portion on the mini-disc the musical air is to be linked, while indicating, in the sector 1, to which portion on the mini-disc the name of the musical air is to be linked. It becomes possible in this manner to erase a musical air, join two musical airs into one or to increase the number of letters of the track name subsequently.

With the MD block 1, in duplicating the audio data, statements of the recording time and date of the UTOC sector 2 are differentiated between the case of duplicating the audio data over the first channel not performing duplicate number management and the case of duplicating the audio data over the second channel performing the duplicate number management.

Specifically, if the audio data is to be duplicated over the first channel not performing duplicate number management, the value of the seconds of the recording time and date associated with the audio data is set to 0 (zero). If the audio data is to be duplicated over the second channel performing duplicate number management, the value of the seconds of the recording time and date associated with the audio data isset to a value associated with the number of duplicates of the audio data. Thus, if the audio data is to be duplicated over the second channel, the number of seconds of the recording time and date for the audio data is set so as not to be 0 (zero).

Thus, by confirming the value of the number of seconds of the recording time and date for the audio data. recorded on the disc 111B of the mini-disc 111, it can be reliably discerned if the audio data has been duplicated through the first route not performing the duplicate number management, that is the audio data is that supplied from the CD block 4, if the audio data has been duplicated through the second route performing the duplicate number management that is the audio data is that supplied from the hard disc device 3 through the host controller 2.

By exploiting the maker and model codes of the UTOC sector 2 for the recorded audio data, it is possible for the host controller 2 to verify whether or not the recording medium is that which has recorded the audio data supplied through the host controller 2, that is whether or not the audio data is that which has been checked-out through the host controller 2.

[Host Controller 2]

Figure 8:
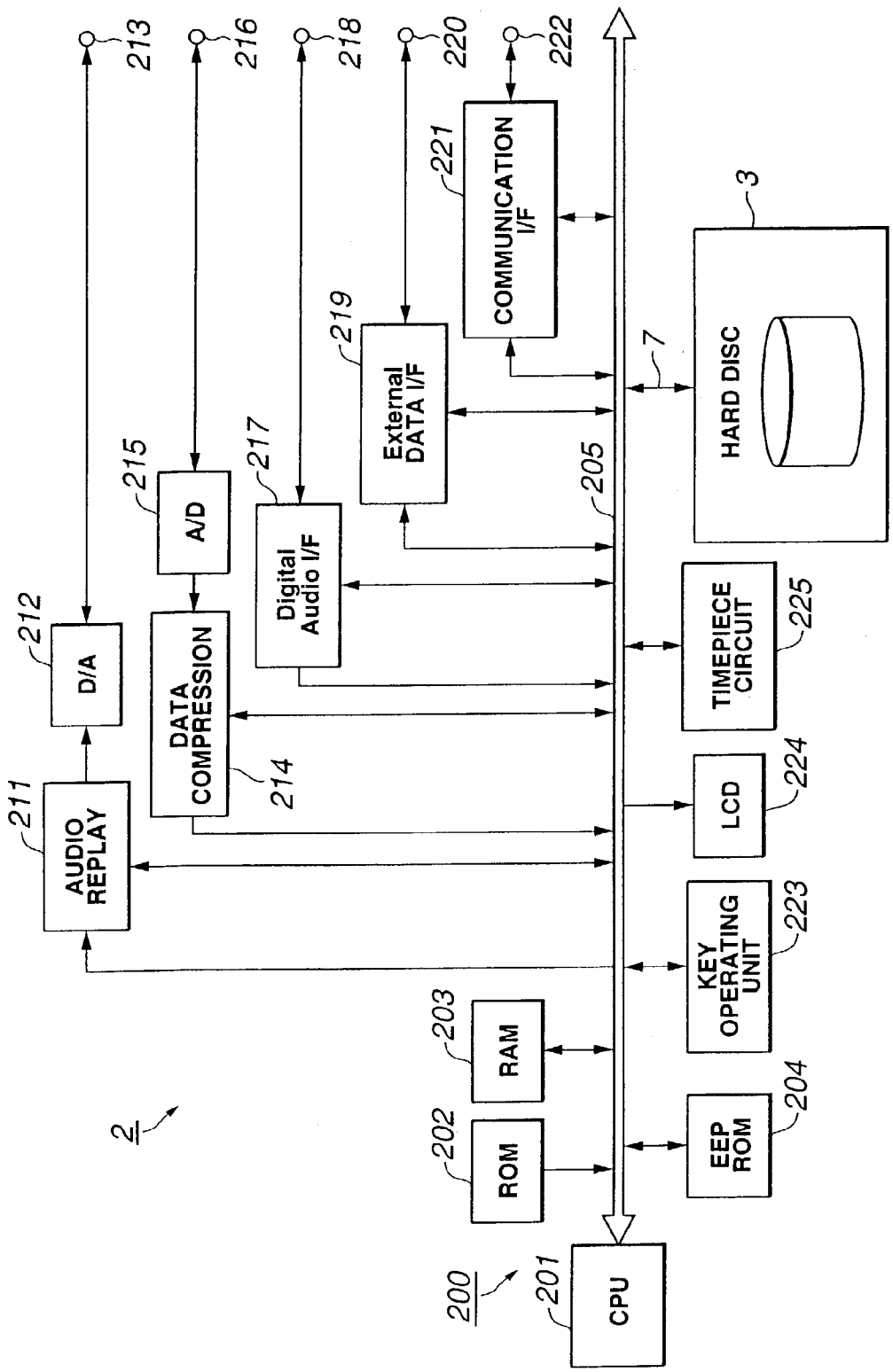
FIG. 8 is a block diagram for illustrating a host controller shown in FIG. 2.

The host controller 2, responsible for duplicate number management of audio data, output from the hard disc device 3 to the MD block 1 for duplication on the mini-disc, is explained. FIG. 8 illustrates the host controller 2 of the present embodiment of the audio recording and/or reproducing system.

Referring to FIG. 8, the host controller 2 includes an audio reproducing unit 211, a D/A converting circuit 212, an analog audio output terminal 213, a data compression unit 214, an A/D converting circuit 215, a digital audio interface 217, a digital audio output terminal 218, an external data interface 219, an external data input/output terminal 220, a communication interface 221, an input/output terminal for control signals 222 and a controller 200.

The controller 200, controlling various portions of this host controller 2, is a micro-computer comprised of a CPU 201, a ROM 202, a RAM 203 and an EEPROM 204, interconnected over a CPU bus 205. To the controller 200 are connected a key operating unit 223, a LCD 224, as a display unit, and a timepiece circuit 225. To the host controller 2 is also connected the hard disc device 3 over a system bus 7.

In the ROM 202, there are recorded various programs executed on the host controller 2 and data required for processing. The RAM 203 is used as a working area in which data is to be stored transiently in various processing operations.

The EEPROM 204 is a so-called non-volatile memory from which data stored therein cannot be erased even on power down of the host controller 2. Thus, various setting parameters are stored in this EEPROM.

The key operating unit 223 is provided with variegated function keys and accepts various command inputs from the user to notify such effect to the controller 200. The LCD 224, capable of demonstrating various display information, while the timepiece circuit 225 has the so-called calendar function such that the timepiece circuit 225 is able to furnish not only the current time but also the current day of the month, current month of the year and the current year.

In the present embodiment, the loudspeaker SP1, SP2 are connected to the analog audio output terminal 213. The audio reproducing unit 211 is supplied with the compressed audio data read out from the hard disc of the hard disc device 3 to compand the audio data to restore pre-compression audio data which is sent to the D/A converting circuit 212.

The D/A converting circuit 212 forms analog audio signals from the digital audio data supplied thereto and outputs the so formed analog audio signals at the analog audio output terminal 213. The output analog audio signals are sent to the loudspeakers SP1, SP2 from which is radiated the speech corresponding to the analog audio signals.

Thus, the host controller 2 is responsive to a command input from a user input through the key operating unit 221 to read out the targeted audio data from the hard disc of the hard disc device 3 to output the so read out audio data through the audio reproducing unit 211, D/A converting circuit 212 and the analog audio output terminal 213. The output audio data is sent to the loudspeakers SP1, SP2 to furnish the speech corresponding to the audio data from the hard disc device 3.

The analog audio signals from other equipment, such as CD block 4, are sent through an input terminal 216 of the analog audio signals to the A/D converting circuit 215. This A/D converting circuit 215 converts the analog audio signals supplied thereto into digital audio data, which is sent to the data compression unit 214.

The data compression unit 214 compresses the digital audio data, supplied thereto, in accordance with a preset compression system. The compressed digital audio data, compressed in the data compression unit 214, is encrypted in the controller 200 and thence supplied to the bard disc device 3 so as to be stored and held on a horizontal direction of the hard disc device 3.

In this manner, the host controller 2 is supplied with analog audio signals from an external equipment and digitizes the signals. The host controller 2 also compresses and encrypts the signals for storage on the hard disc of the hard disc device 3.

In the host controller 2, shown in FIG. 8, a digital audio equipment, such as the CD block 4, is connected to the digital audio output terminal 218. The host controller 2 is supplied through the digital audio output terminal 218 with the PCM -audio data, such as digital audio data with the sampling frequency of 44.1 kHz and with the number of quantization bits equal to 16, from the digital audio equipment, to capture the data through the digital audio interface 217.

The digital audio data, here captured, may directly be sent to and recorded on the hard disc device 3. Alternatively, the data maybe compressed in the data compression unit 214 and encrypted by the controller 200 so as to be then supplied to and recorded on the hard disc device 3.

In the present embodiment, the data transmission channel 5 between the host controller and the MD block 1 is connected to the external data input/output terminal 220. The digital audio data, compressed in accordance with the ATRAC system between the hard disc device 3 and the MD block 1 and moreover encrypted may be transmitted/received through the external data input/output terminal 220 and the external data interface 219.

To the input/output terminal 222 are connected the system-to-system communication channel 6 between the host controller and the MD block 1 and the system-to-system communication channel 10 between the host controller and the CD block 4. Through the input/output terminal 222 and the communication interface 221, it is possible to exchange commands and control data with various equipment such as MD block 1 or the CD block 4.

In this manner, the host controller 2 is responsive to a command input from the user, input through a key operating part 223, to transmit a control signal to the MD block 1 or to the CD block 4, through the communication interface 221 and the external data input/output terminal 222, to actuate the MD block 1 or the CD block 4 to receive audio data or analog audio signals from the MD block 1 or the CD block 4 to record the so supplied audio data and analog audio signals on the hard disc of the hard disc device 3.

The host controller 2 is responsive to an input command from the user, input through the key operating part 223, to send the control signal to the MD block 1 through the communication interface 221 and the input/output terminal 222 to set the MD block 1 to the recording mode to send the digital audio data read out from the hard disc device 3 to the MD block 1 through the external data interface 219 and the external data input/output terminal 220 to duplicate the digital audio data on the mini-disc loaded on the MD block 1.

When the digital audio data read out from the hard disc device 3 is duplicated by the MD block 1 on the mini-disc, the host controller 2 cooperates with the MD block 1 to perform management of the plural number of duplicates of the digital audio data, as will also be explained in detail subsequently.

If, in the audio recording and/or reproducing system of the present embodiment, audio data from the hard disc device 3 is to be duplicated through the host controller 2, the recording date and time (recording time) of the sector 2 of the UTOC corresponding to the audio data to be duplicated is stated in a manner different from that used in duplicating the audio data from the CD block 4, that is different from that in the case of duplication through the conventional route of duplication.

In the present embodiment of the audio recording and/or reproducing system, as also mentioned previously, if the audio data from the CD block 4 is to be duplicated, the value of the number of seconds of the recording time is necessarily set to zero, whereas, if audio data from the hard disc device 3 is to be duplicated, the value of the number of seconds of the recording time is set to a value other than zero.

The MD block 1 sends the recording time, expressed in different fashions, to the host controller 2, over the system-to-system communication channel 6, together with the model code and the maker code of the MD block 1 itself. Thus, the host controller 2 stores and holds them as a check-out list (hysteresis of checkout) to perform duplicate number management of the digital audio data output from the host controller 2. In this case, the host controller 2 forms a check-out list on the hard disc of the hard disc device 3.

Figures 9, 10:
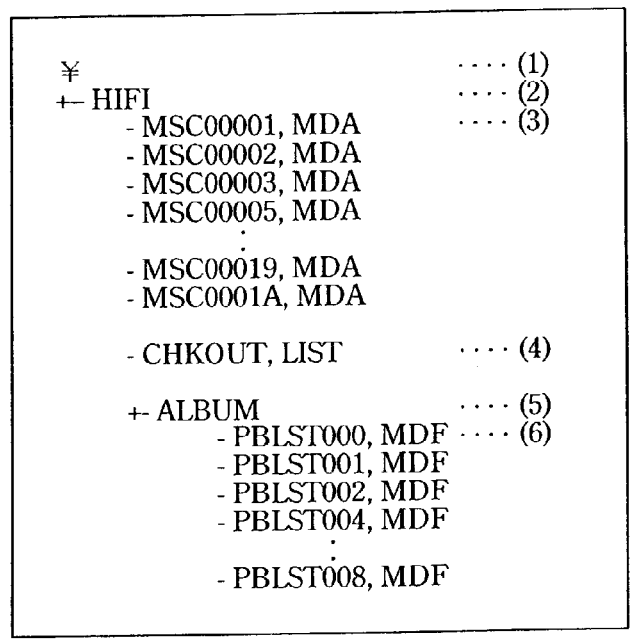
FIG. 9 illustrates a file created and managed in a hard disc of a hard disc device.
FIG. 10 illustrates a check-out list file.

FIG. 9 illustrates the file directory structure to be constructed on a file system of the hard disc device 3. Referring to FIG. 9, there is a HIFI directory (2) for accommodating audio files below a root directory (1). Below the HIFI directory (2), there are an audio data file (3), a checkout list file (4) and an album information directory (5). Below the album information directory (5), there is an album information file (6).

The audio data file (3) is a file comprised of audio data to the leading end of which is appended a header containing the music air information, such as size, titles etc. The audio data is data encoded with ATRAC, as in the case of the MD. The file name includes numerical figures, here in the hexadecimal notation. Each file is designed to have a unique numerical figure as the file name.

The album information file (6) is a management file for grouping plural audio data files (3). One album information file (6) is associated with one group, with the contents of the album information file (6) being the information on the numerical figures of the filenames of the audio data files (3) belonging to one common group. The filename of the album information file (6) includes a numerical figure, here the numerical figure in the hexadecimal notation. Each file has a unique numerical figure as the filename.

The checkout list file (4) is a file for recording that the audio data on the hard disc 2 has been copied on the mini-disc 111. Data takeout from the hard disc device 3 to the mini-disc 111 of the MD block 1 is termed checkout. In other words, the checkout means outputting audio data recorded on the hard disc device 3 to the MD block 1 (recording equipment) for duplication on a recording medium.

In the present embodiment, when audio data from the hard disc device 3 is to be duplicated for checkout, the MD block 1 records one audio data file (3) of the hard disc device 3 as one track of the mini-disc 111. When the audio data has been checked out, the host controller 2 adds a record containing the following information to the checkout list file (4), based on the information from the MD block 1 or from the information it owns, as mentioned previously.

FIG. 10 illustrates data written in the checkout list file (CHKOUT.LST)shown in FIG. 9. In checking-out, the host controller 2 writes the following data (i) to (iv) in the checkout list file.

That is, (i) the information on the numerical value of the filename of the audio data file (3) as checked out, (ii) the information on the numerical value of the filename of the album information file (6) corresponding to the group to which belongs the audio data file (3) as checked out, (iii) the information on the time point as recorded in checking-out on the sector 2 of the UTOC of the mini-disc 111, and (iv) the information on the maker code and the model code as recorded in checking-out in the UTOC sector 2 of the mini-disc 1.

In addition to the above information, the other information may be added as necessary to the record. Examples of these other information include (a) the information on the size of the track on the mini-disc 111 prepared in checking-out, (b) the information on the address on a disc 111B which has started recording the track on the mini-disc 111 prepared in checking-out, and (c) the information concerning part or all of the. recorded audio data or the information concerning what has been converted as provided in part or all of the recorded audio data.

(a) The size of the track on the mini-disc 111 can be represented by the number of bytes or the number of the sound groups. (b) The address on the disc 111B which has started recording the track on the mini-disc 111 in checking-out is a physical start address on the mini-disc.

(c) The information concerning part or all of the recorded audio data or the information concerning what has been converted as provided in part or all of the recorded audio data may be assumed to be data of the leading 100 bytes of the audio data which has been checked out or the check sum of the audio data which has been checked out.

These information can be used to improve reliability in determining that the track recorded on the mini-disc 111 has been checked out.

If at least the information indicated in FIG. 10 are provided, the host controller 2 is able to perform reliable management as to which audio data has been output at which time to a recording medium of which equipment by way of checking-out. On the part of the mini-disc itself, it can be discriminated, based on the value of the number of seconds in the recording time of the UTOC sector 2, whether or not the audio data from the hard disc device 3 has been duplicated by check-out.

In the above-described instance, if the value of the number of seconds of the recording time of the UTOC sector 2 is 0 (zero), the audio data may be discerned to be the data supplied from the CD block 4 and duplicated, whereas, if the value of the number of seconds of the recording time of the UTOC sector 2 is other than 0 (zero), the audio data may be discerned to be the data supplied hard disc device 3 and duplicated.

The duplicate number management (limitation) of audio data output from the hard disc device 3, that is the duplication control exploiting check-in and check-out, may be achieved on the basis of the check-out list provided on the host controller 2 and on the recording time of the UTOC sector 2 corresponding to the audio data recorded by the MD block 1 on the mini-disc.

In the case of a mini-disc on which audio data has been recorded by check-out, the value of the number of seconds of the recording time of the UTOC sector 2, corresponding to the track which has recorded the audio data, is set in checking-out to a numerical figure other than 0 (zero), as mentioned previously. On the part of the host controller 2, a check-out list, made up of the discriminating information for audio data, recording time, maker code and the model code of the MD block 1, for example, is formed on the hard disc of the hard disc device 3, as shown in FIG. 10.

The checking-in operation can be performed only on the track of the checked-out audio data on the MD 111B on which the audio data has been recorded by check-out. Thus, if the track on the MD 111B has been confirmed to have been checked out, the host controller 2 deletes the registration on the track from the UTOC of the MD 111B. The corresponding record concerning the audio data file (3) is also deleted from the checkout list file (4).

The important point of the present invention resides in means for specifying that a certain track on the MD 111B is the track on which has been recorded the checked-out audio data. That is, the host controller 2 of the present embodiment discerns whether or not check-in is possible by acquiring the information on the target track of the UTOC sector 2 of the MD 111, such as the recording time, maker code or the model code, and by checking to see if the information on the recording time is coincident with the time information on the record of the checkout list file (4).

It should be noted that the host controller 2 is also able to check for coincidence with not the maker code or the model code on the checkout list file (4) but with the maker code or the model code held from the outset in the audio recording and/or reproducing system of the present embodiment.

[Operation of the Audio Recording and/or Reproducing System]

The operation at the time of normal recording, check-out operation and the check-in operation, performed in the present embodiment of the audio recording and/or reproducing system, is hereinafter explained. The normal recording means the so-called one-track recording in which audio data from the CD block 4 is recorded on the mini-disc 111B loaded on the MD block 1.

[Operation in Normal Recording]

Figure 11:
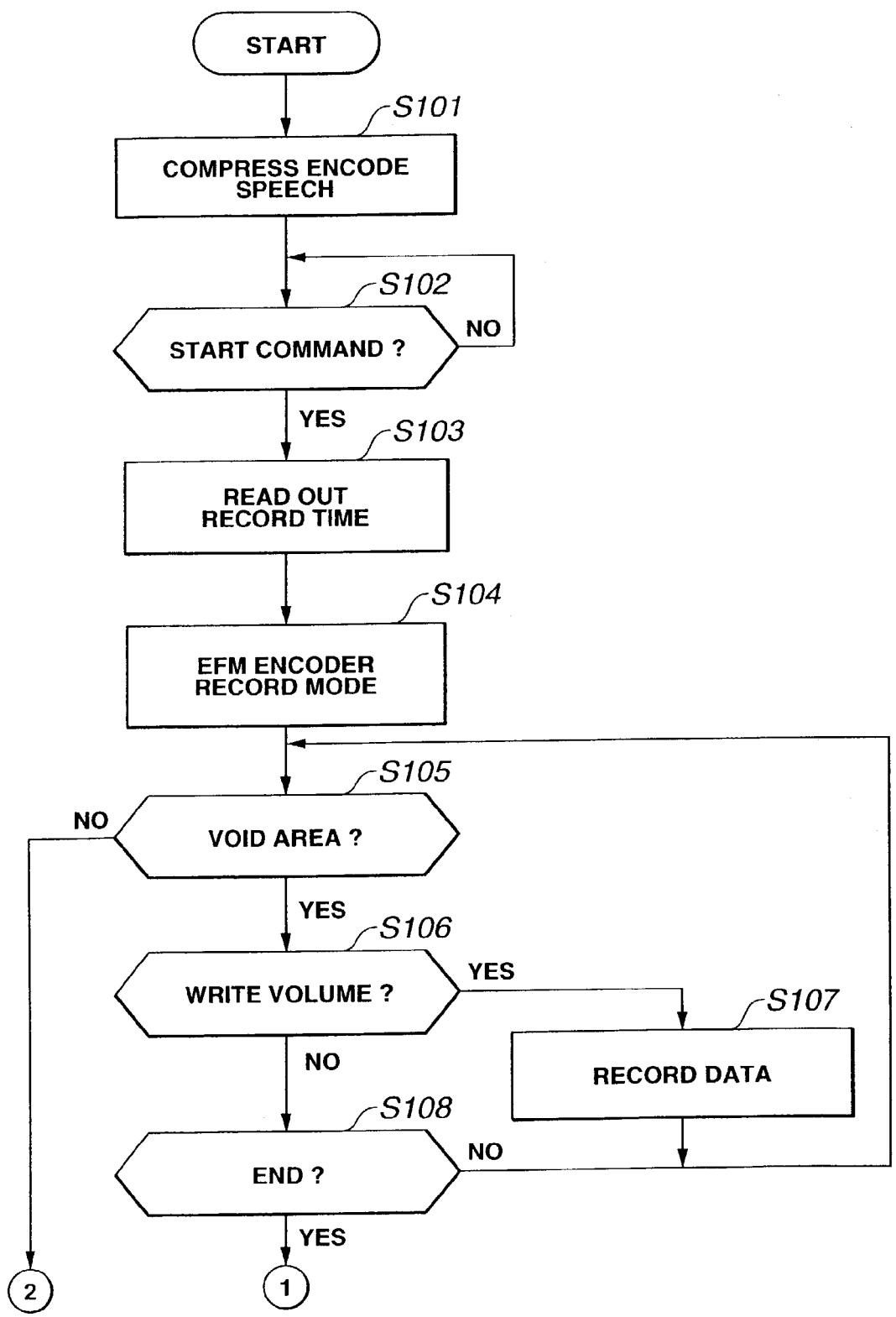
FIGS. 11 and 12 are flowcharts for illustrating the operation of the usual recording performed in the audio recording and/or reproducing system shown in FIG. 2.
Figure 12:
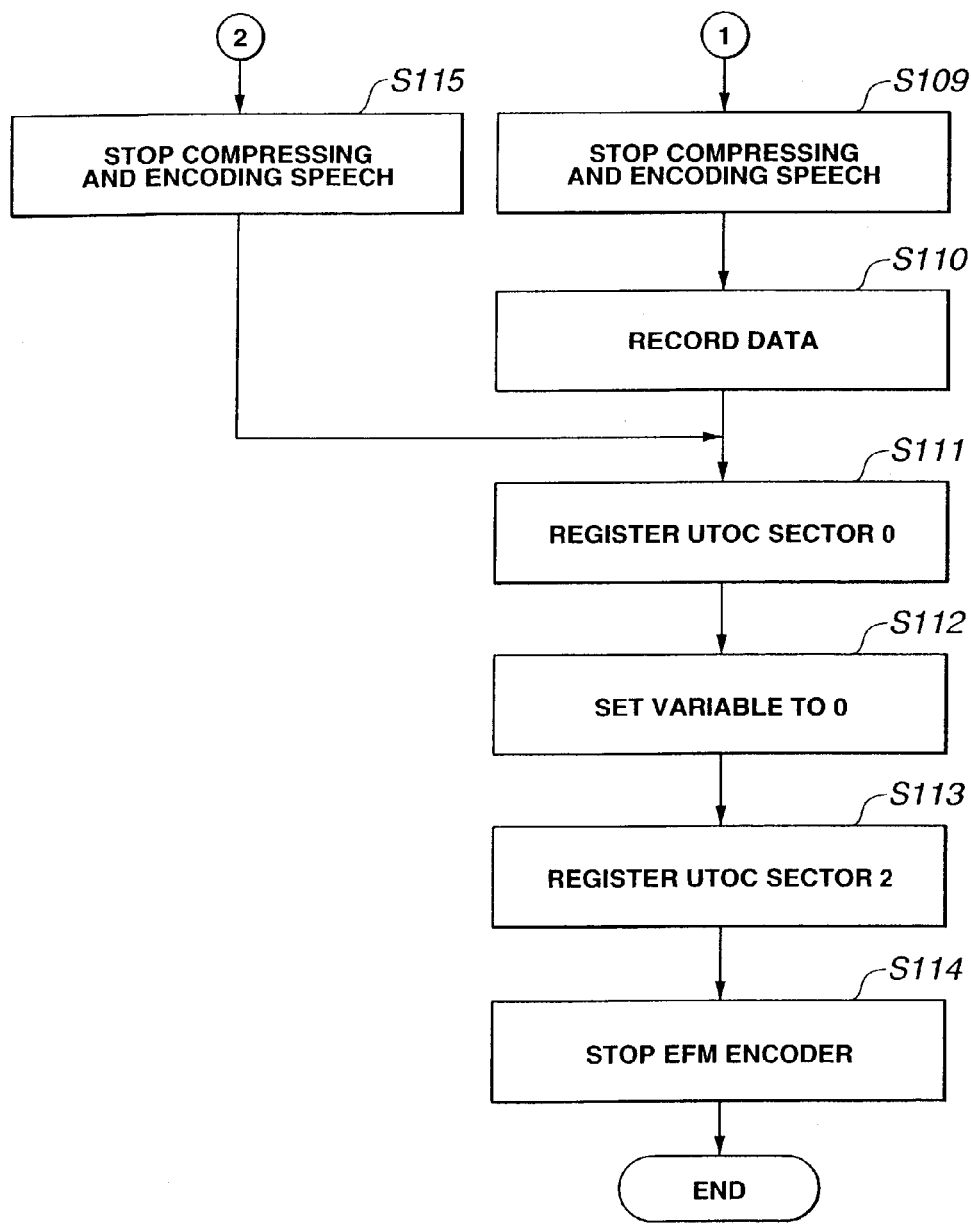

First, the operation during the normal recording is explained. FIGS. 11 and 12 are flowcharts for illustrating the operation of the MD block 1 during the normal recording. In the normal recording of the audio recording and/or reproducing system of the present embodiment of supplying audio data from the CD block 4 to the MD block 1 for recording the audio data on the MD 11 loaded on the MD block 1, duplication management by the host controller 2 is not performed.

When the audio data recorded on the compact disc loaded on the CD block 4 is adapted to be reproduced and the MD block 1 is set to the recording pause state, the system controller 150 of the MD block 1 starts the processing shown in FIGS. 11 and 12. At this time, the audio data from the CD block 4 is supplied through the digital input terminal 121 and the digital audio I/F 122 to the speech compression encoder/decoder 123.

The system controller 150 of the MD block 1 controls the speech compression encoder/decoder 123 to start the encoding (step S101). The audio data, which is the encoded data compressed in accordance with the ATRAC system, is then stored in the DRAM 125 through the memory controller 124.

The system controller 150 of the MD block 1 waits for a recording start command, that is a recording pause cancellation command, from the user (step S102). The recording start command is given through for example the key operating unit 152. If it is determined at step S102 that the recording start command has been issued, the system controller 150 reads out the current time from a timing circuit 153 to store it as recording time in a variable Rec Time (step S103).

The system controller 150 sets the encoder/decoder 126 to the recording mode to enable the audio data to be recorded on the MD 111 (step S104). The system controller 150 then checks whether or not there is any void area in the MD 111 (step S105) and, if it is determined that there is such void area, it is checked whether or not the audio data stored in the DRAM 125 has reached a volume sufficient for writing on the MD 111 (step S106).

The volume sufficient for writing is data of one cluster as a writing unit. If, in the decision processing at step S106, a sufficient amount of the audio data has been stored in the DRAM 125, the system controller 150 causes the audio data stored in the DRAM 125 to be recorded on the MD 111 (step S107) to repeat the processing as from step S105. That is, the sequence of operations for recording the audio data, such as taking the newly supplied audio data in the DRAM 125, is repeated.

If, in the decision processing at step S106, a sufficient amount of audio data has not been stored in the DRAM 125, it is checked whether or not a command for recording stop has been issued from the user (step S108). If, in the decision processing at step S108, it is determined that the stop command has not been issued, the processing as from step S105 is repeated to repeat the sequence of the recording operations such as taking audio data into the DRAM.

If, in the decision processing of step S108, it is verified that the stop command has been issued, the system controller halts the speech compression encoder/decoder 123 (step S109), as shown in FIG. 11, to record the audio data stored in the DRAM 125 on the MD 111 (step S110). If, in the processing at step S110, the data stored in the DRAM 125 has not reached one cluster, the deficit is padded with zeros and recorded on the MD 111.

The system controller 150 registers the information concerning the area of the MD 111, which has recorded the audio data, on the UTOC sector 0 as a track (step S111). Since the processing shown in FIGS. 11, 12 is the processing in normal recording but is not the duplication channel with check-in and check-out, as described above, the system controller 150 sets the lowermost order byte of the variable Rec Time, stored at step S103, to 0 (zero) (step S112).

Then, using the value of the Rec Time, the value of the second of which as been set to 0 (zero), as the recording time, the maker code and the model code, held in the ROM of the system controller 150, are read out and registered in the UTOC sector 2 (step S113). The system controller 150 stops the operation of the encoder/decoder 126 (Step S114) to finish the processing in normal recording shown in FIGS. 11 and 12.

If, in the decision processing of step S105, shown in FIG. 11, it is determined that there is no void area on the MD 111, the system controller 150 stops the speech compression encoder/decoder 123 (step S115), as shown in FIG. 12, to proceed to the processing as from step S111.

That is, the system controller 150 registers the UTOC sector 0 (step S111), sets the value of the second of the variable Rec Time to 0 (zero) (step S112) and registers the UTOC sector 2 (step S113), after which the system controller halts the operation of for example the encoder/decoder 126 (step S114) to finish the processing in normal recording.

That is, during the normal recording when the host controller 2 does not perform the management of the number of times of duplication, the value of the second of the recording storage of the UTOC sector 2 is set to 0 (zero).

[Operation in Checking-out]

The operation in checking-out, performed in the audio recording and/or reproducing system of the present embodiment, is now explained. FIGS. 13A, 13B, 14A, 14B, 15A and 15B are flowcharts for illustrating the check-out operation in the present embodiment of the audio recording and/or reproducing system.

Figure 13A:
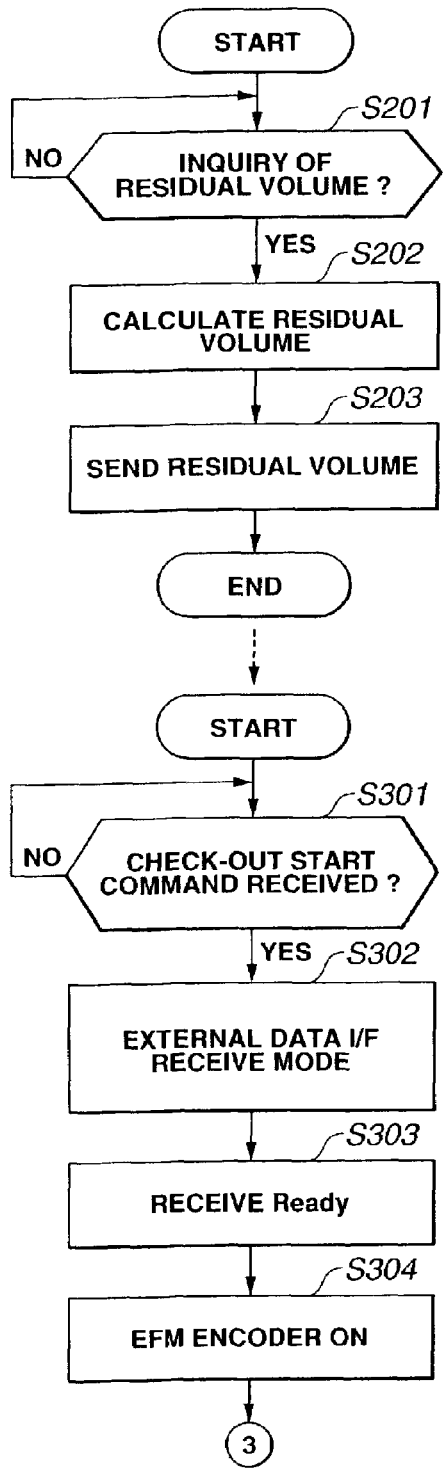
FIGS. 13A and 13B are flowcharts for illustrating the operation for usual recording performed in checking-out in the audio recording and/or reproducing system shown in FIG. 2.
Figure 13B:
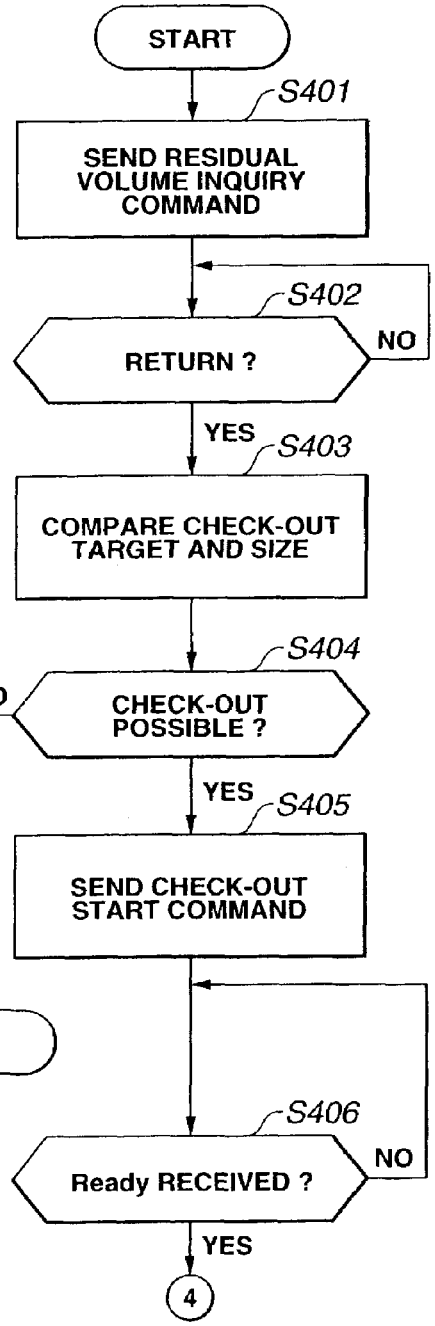
Figures 15A, 15B:
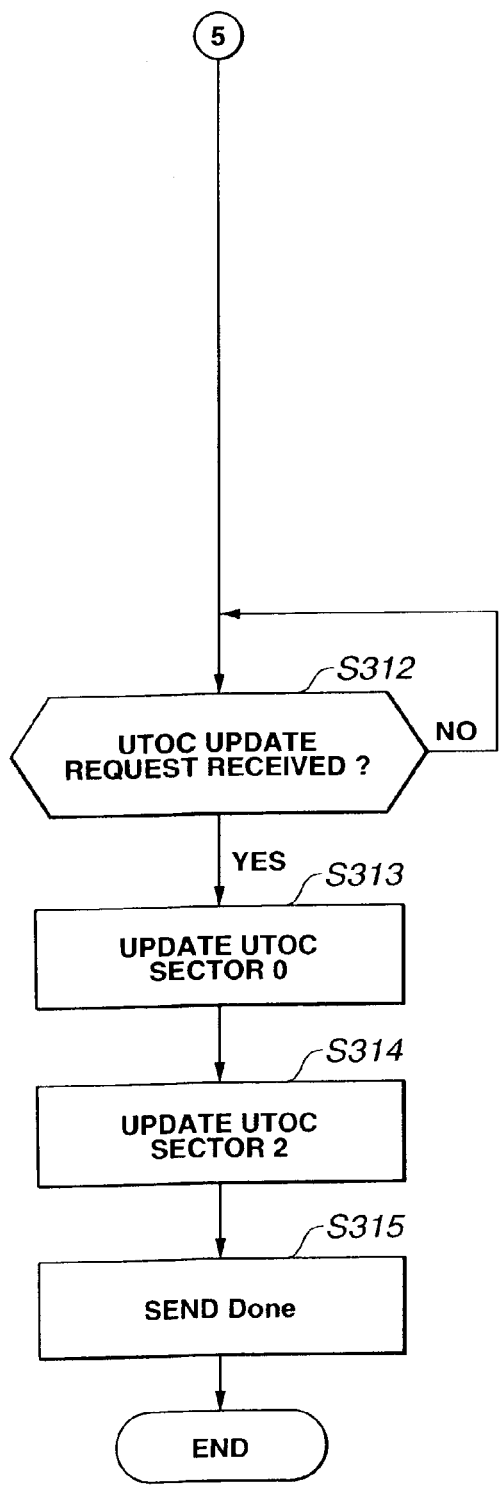
FIGS. 15A and 15B are flowcharts continuing to FIGS. 14A and 14B, respectively.

As mentioned previously, the MD block 1 and the host controller 2 must operate in a concerted fashion in performing the check-out operation. So, the operations of the MD block 1 and the host controller 2 in checking-out are explained together. Meanwhile, FIGS. 13A, 14A and 15A show the processing on the part of the MD block 1, with the reference numerals being two hundreds and three hundreds. FIGS. 13B, 14B and 15B show the processing on the part of the host controller 2, with the reference numerals being four hundredths. Meanwhile, command exchange during operations of the MD block 1 and the host controller 2 is over the system-to-system communication channel 6.

When checking out audio data, that is when duplicating audio data recorded on the hard disc of the hard disc device 3 on the MD 111 loaded on the MD block 1, the user of the present embodiment of the audio recording and/or reproducing system inputs a checkout start command through the key operating part 223 of the host controller 2.

On acceptance of the check-out start command, the host controller 2 checks whether or not the audio data as commanded can be checked-out. If it is verified that the check-out is possible, the host controller 2 starts the processing shown in FIGS. 13B, 14B and 15B. Moreover, the MD block 1 is responsive to the commands from the host controller 2 to execute the processing shown in FIGS. 13A, 14A and 15A.

Meanwhile, whether or not the check-out is possible with audio data may be determined depending on whether or not there are a preset number of records for target audio data in the check list file formed in the hard disc of the hard disc device 3, or by referencing the number of times of check-out in case the number of times of check-out is controlled using a different file from one audio data to another.

First, if the host controller 2 receives a checkout start command from the user through the key operating part 223, and has verified that check-out of the audio data as commanded is possible, the host controller 2 sends an inquiry as to the residual recording capacity of the mini-disc (step S401).

The MD block 1 waits for the residual capacity inquiring command, sent from the host controller 2 (step S201). If the MD block 1 has determined that the residual capacity inquiring command has been sent, the system controller 150 of the MD block 1 calculates the residual capacity of the MD 111 loaded thereon (step S202).

The system controller 150 of the MD block 1 sends the residual capacity of the mini-disc 111, calculated at step S202, through the system-to-system communication channel 6 to the host controller 2 (step S203), to finish the residual capacity inquiry processing, to get the processing for duplicating the audio data started by checking-out. The system controller 150 then is in a state of waiting for arrival of the checkout start command from the host controller 2 (step S301).

The host controller 2 waits for a response from the MD block 1 as to the residual capacity (step S402). If the host controller 2 has verified that the response as to the residual capacity has been sent, the controller 200 of the host controller 2 compares the size of the audio data to be checked-out to the residual capacity from the MD block 1 (step S403).

Based on the results of comparison at step S403, the controller 200 of the host controller 2 verifies whether or not the check-out is possible (step S404). If, at step S404, the residual capacity of the mini-disc 111 is lesser than the data volume of the audio data to be checked-out, the controller 200 deems the check-out to be impossible to terminate the check-out processing.

If, at step S404, the residual capacity of the mini-disc 111B is larger than the data volume of the audio data to be checked-out, such that check-out is possible, the controller 200 of the host controller 2 sends a check-out start command to the MD block 1 (step S405). The controller then is in a state of awaiting reception of a Ready command from the MD block 1 (step S406).

If the MD block 1 at step S301 has determined that the check-out start command from the host controller 2 has been received, the system controller 150 of the MD block 1 sets the external data interface 131, connected over data transmission channel 5 to the host controller 2, to the receiving mode, to enable the external data interface 131 to receive the audio data from the host controller 2 (step S302).

Subsequently, the system controller 150 of the MD block 1 sends the Ready command to the host controller 2 (step S303) to actuate the speech compression encoder/decoder 123 or the encoder/decoder 126 (step S304). The system controller then proceeds to the processing of FIG. 14A to enable the audio data to be recorded on the mini-disc 111.

If the controller 200 of the host controller 2 at step S406 has determined that the Ready command has been received from the MD block 1, the controller proceeds to the processing of FIG. 14B to control the hard disc device 3 to open the audio data file holding the targeted audio data (step S407).

If there is a void area in the buffer for transmission, the controller 200 of the host controller 2 effectuates file reading. Moreover, if transmission is possible, the audio data is transmitted to the MD block 1 through the data transmission channel 5 (step S408). The controller 200 of the host controller 2 detects the end of file (EOF) and checks to see whether or not the data transmission has come to a finish (step S409). If the EOF has been detected and it has been determined that the data transmission has not come to a close, the processing as from step S408 is repeated.

If, in the processing at step S409, the EOF is detected, and it has been determined that the data transmission has come to a close, the controller 200 of the host controller 2 ceases to read in the file, but only sends the audio data already read out. After the end of transmission of the entire audio data, the controller sends the EOF command to the MD block I (step S410). The controller 200 of the host controller 2 closes the audio file on the hard disc of the hard disc device 3, from which the audio data is to be transmitted in its entirety (step S411).

The MD block 1 sequentially receives audio data from the host controller 2 and decrypts the audio data by the cipher encoder/decoder to store the data in the DRAM 125. The MD block 1 then checks to see whether or not the audio data has been stored in the DRAM 125 in an amount exceeding one cluster (step S305). If, in the processing of step S304, it has been detected that the data has been stored in the DRAM 125 in an amount exceeding one cluster, the system controller 150 of the MD block 1 causes the audio data stored in the DRAM 125 to be recorded on the mini-disc 111, as during the normal recording, explained previously (step S306).

After recording one cluster of audio data on the mini-disc 111 at step S306, and if, in the processing at step S305, the data in an amount exceeding one cluster has not been stored in the DRAM 125, it is checked whether or not the EOF command from the host controller 2 has been received (step S307).

If, in the processing at step S307, it is determined that the EOF command has not been received, the processing as from step S305 is repeated. That is, the processing of steps S305 and S306 is repeated until the EOF command is received.

If it has been determined in the processing at step S307 that the EOF command has been received, the system controller 150 of the MD block 1 records the audio data stored in the DRAM 125 on the mini-disc 111 (step S308). The system controller then de-energizes the EFM encoder (step S309).

The system controller 150 of the MD block 1 reads out its own maker code and model code, stored in its ROM, to send the codes to the host controller 2 (step S310) and also send a Done command (step S311). The system controller 150 of the MD block 1 then proceeds to the processing of FIG. 15A to wait for reception of a UTOC updating request from the host controller 2 (step S312).

On the other hand, the controller 200 of the host controller 2 is ready for receiving the maker and model codes from the Ml block 1 (step S412). On receipt of the maker and model codes, the controller is ready to receive the Done command from the MD block 1 (step S413).

If, in the decision processing at step S413, the controller 200 of the host controller 2 has verified that the Done command from the MD block 1 has been received, the controller proceeds to the processing of FIG. 15B. First, the controller controls the hard disc device 3 to open the check-out list file, provided on the hard disc of the hard disc device 3, as explained previously (step S414).

The controller 200 of the host controller 2 acquires the current time from a timepiece circuit 223 and stores it as check-out time in a variable CO Time, where CO means Check-Out (step S415). In order to set the value of the second of the acquired time information to a value other than 0 (zero), the number of times of check-out of the audio data, output by check-out, is managed on the part of the host controller 2, so that, for the first, second and third check-outs, the number of times is set to 1, 2 and 3, respectively (step S416).

For managing the number of times of the audio data check-outs, a file for accommodating the information for discriminating the audio data, such as filenames of the audio data, and the number of times of the check-outs, may be prepared, and the number of times of check-outs may be updated or the new data may be added, each time a check-out is made. Alternatively, the number of times of the check-outs may be provided on the check-out list.

The controller 200 of the host controller 2 prepares a record of the check-out list file, based on the maker and model codes from the MD block 1, variable CO Time value, the numerical value of the filename of the target audio data file, or the value of the filename of the album management file of the group to which belongs the target file (step S417). These values are adapted to be received at step S412.

The controller 200 of the host controller 2 adds and writes the record of the check-out list file, prepared at step S417, in a check-out list file (step S418), to close the check-out list file (step. S419).

Since the updating of the check-out list file is terminated, the controller 200 of the host controller 2 sends the UTOC updating command to the MD block 1 (step S420). At this time, the CO Time information is also sent as a parameter.

If the system controller 150 of the MD block 1 at the decision step of step S310 has decided that the UTOC updating command from the host controller 2 has been received, the system controller 150 updates the UTOC sector-0 (step S313), based on the area information on the mini-disc 111, which has recorded the audio data supplied from the host controller 2 on check-out, and adopts the time information (CO Time) received from the host controller 2, at step S312, while updating the UTOC sector 2, also using the own maker and model codes (step S314).

Since this terminates the updating on the part of the MD block 1, the system controller sends a Done command to the host controller 2 (step S315) to terminate the check-out processing on the part of the MD block 1 shown in FIGS. 13A, 14A and 15A.

The controller 200 of the host controller 2 is in a state of waiting for the reception of the Done command from the MD block 1 (step S421). On reception of the Done command, the check-out processing on the part of the host controller 2 shown in FIGS. 13B, 14B and 15B is terminated. This finishes the checkout processing in the present embodiment of the audio recording and/or reproducing system.

Thus, in check-out, the recording time recorded in the UTOC sector 2 of the mini-disc 111 is acquired on the part of the host controller 2, and has been adjusted so that its second will be of a value other than 0 (zero).

The audio data duplicated on the mini-disc by ordinary recording explained using FIGS. 11 and 12 differs from the audio data duplicated on the mini-disc by checkout as to the value of the second of the recording time for the audio data, so that the data routinely recorded can be distinguished from that recorded with check-out.

Since the check-out list shown in FIG. 10 is formed on the part of the host controller 2, this check-out list may also be used to effectuate without any inconvenience the check-out operation on the audio data checked-out to the mini-disc.

[Operation in Check-in]

The check-in operation, carried out in the audio recording and/or reproducing system of the present embodiment, is hereinafter explained. FIG. 16 is a flowchart for illustrating the check-in operation effectuated in the present embodiment of the audio recording and/or reproducing system.

The check-in operation also has to occur as the MD block 1 and the host controller 2 operate in unison with each other.

Figure 16A:
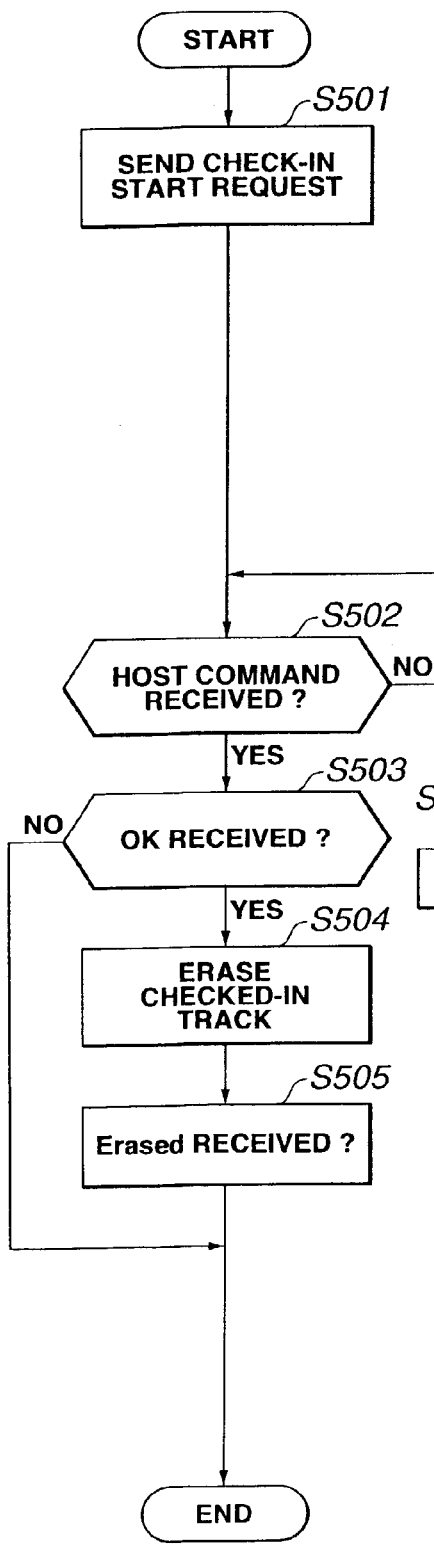
FIGS. 16A and 16B are flowcharts for illustrating the operation for usual recording performed in checking-in in the audio recording and/or reproducing system shown in FIG. 2.

So, the operation of the MD block 1 and that of the host controller 2 are hereinafter explained in a parallel manner. FIG. 16A is a flowchart showing the processing on the part of the MD block 1 with reference numerals of five hundreds.

Figure 16B:
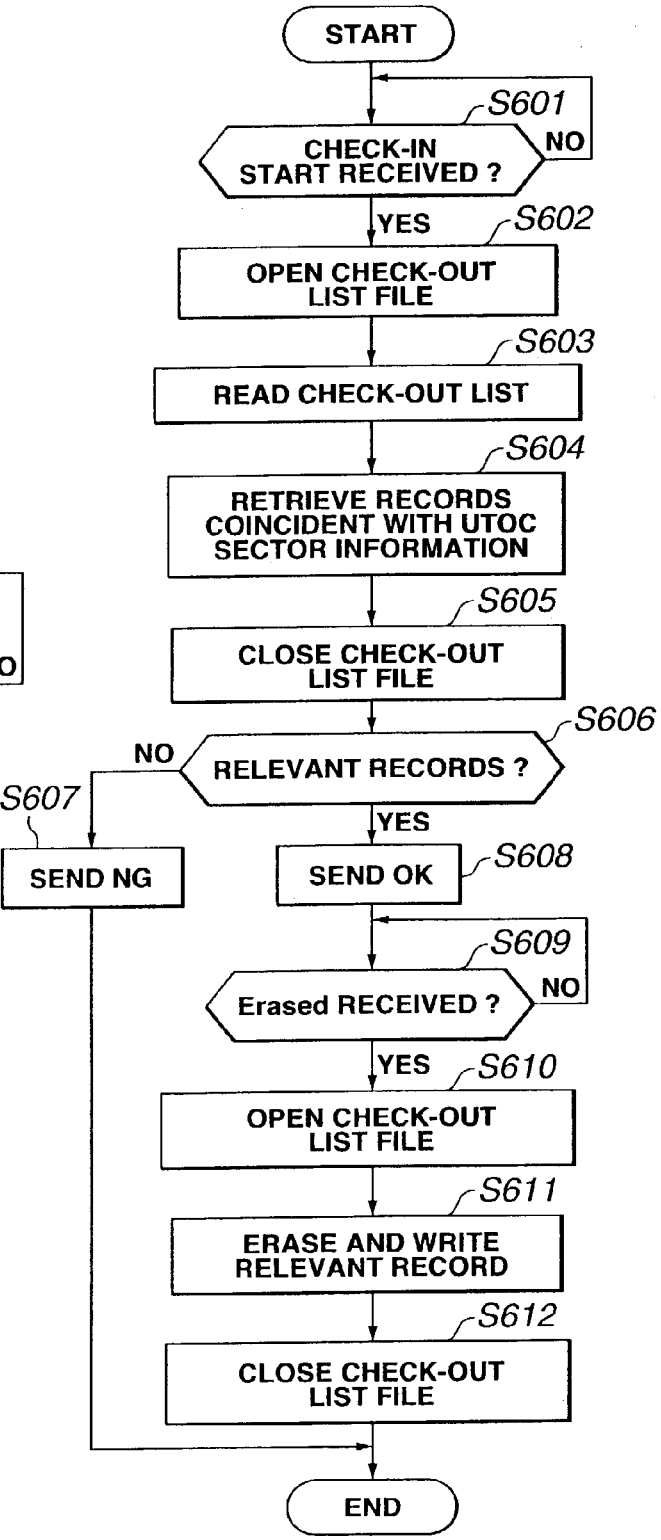

FIG. 16B is a flowchart showing the processing on the part of the host controller 2 with six hundreds of reference numerals. Meanwhile, command exchange between the MD block 1 and the host controller 2 is over the system-to-system communication channel 6.

If, for example, a check-in start command from the user is input from the key operating unit 152 of the MD block 1 or from the key operating unit 223 of the host controller 2, the system controller 150 of the MD block 1 executes the processing shown in FIG. 16A, while the controller 200 of the host controller 2 executes the processing shown in FIG. 16B.

The system controller 150 of the MD block 1 sends the check-in start command, along with the UTOC sector 2 information of the specified track (audio data), to the host side (step S501), and is in a condition of waiting for a command from the host controller 2 (step S502). It should be noted that the UTOC sector 2 information is the information made up by the recording time, maker code and the model code, recorded on the UTOC sector 2 in association with the track specified for check-in (audio data).

The controller 200 of the host controller 2 is in a state of waiting for a check-in start command from the MD block 1 (step S601) and, when it has determined at step S601 that it has received the check-in start command from the MD block 1, it controls the hard disc device 3 to open the check-out list file formulated on the hard disc of the hard disc device 3 (step S602).

The controller 200 of the host controller 2 reads out a record of the check-out list file to the buffer in the controller 200 of the host controller 2 (step S602) to retrieve the record coincident with the UTOC sector 2 information from the MD block 1 (step S604). The controller 200 of the host controller 2 closes the opened check-out list file (step S605) to check whether or not there is the corresponding record (step S606).

The processing at steps S604 and S606 is the processing of confirming whether or not the audio data recorded on the mini-disc specified for check-in is the data checked-out through the host controller 2, and retrieves the record in the check-out list file coincident in recording time, maker code and in the model code. If, at steps S603 and S604, the totality of records cannot be placed on the buffer, search is performed simultaneously with read-out.

If it is found at step S606 that there is no relevant record, the controller 200 of the host controller 2 sends an NG status to the MD block 1 (step S607) to finish the check-in operation.

If the controller 200 of the host controller 2 at step S606 has determined that there is the relevant record, it sends an OK status to the MD block 1 (step S608) to enter into a status of waiting for an Erased command from the MD block 1 indicating the fact of erasure of the relevant audio data (step S609).

If, in the decision step S502, the MD block 1 has determined that the command from the host controller 2 has been received, the MD block checks whether or not the command is an OK command, that is whether or not the audio data being checked-in has been recognized to be one checked-out from the host controller 2 (step S503).

If, in the decision step S503, the command is not the OK command, the system controller 150 of the MD block 1 finishes the check-in operation. If the system controller 150 of the MD block 1 at the decision step S503 has determined that the OK command has been received, the system controller 150 of the MD block 1 erases the UTOC data associated with the targeted audio data (step S504) to send an Erased command notifying the fact of erasure to the host controller 2 (step S505). This finishes the check-in operation on the part of the MD block 1.

If the host controller 2 at the decision step S609 has determined that the Erased command from the MD block 1 has been received, it controls the hard disc device 3 to open the check-out file formed in the hard disc of the hard disc device 3 (step S610) to erase the record to effectuate writing (step S611).

The processing at the same time as this step S611 is the processing of the MD block 1 deleting the relevant data of the check-out list file for the checked-out audio data recorded on the mini-disc and which has been deleted at step S504. If the number of duplicates per audio data is managed by a separate file, the number of times of check-outs for the relevant audio data of the file is also updated.

The check-out list file then is closed (step S612) to finish the check-in operations on the part of the host controller 2. The above finishes the check-in operations for one track.

Thus, in the present embodiment of the audio recording and/or reproducing system, the value (stated value) of the number of seconds in the recording time is differentiated between the case of normal recording when the audio data from the CD block 4 is recorded on the mini-disc loaded on the MD block 1 using the conventional first route and the case of recording when the audio data from the hard disc device 3 is sent through the host controller 2 to the MD block 1 for recording on the mini-disc using a new second route.

This eliminates the inconvenience of erroneously checking-in the audio data supplied from the CD block 4, and achieves a copyright protection system through duplication number management of audio data even with the use of a mini-disc now extensively used as a recording medium.

Even if the audio data duplicated through the conventional route of duplication not performing duplication number control co-exists with audio data duplicated through a new duplication route of performing duplication number control, these audio data can be distinguished and used without any inconvenience.

In the above-described embodiment, the recording time point is acquired from the timing circuit 153 of the MD block 1 and from the timing circuit 225 of the host controller 2 for normal recording and for check-out, respectively. This, however, is not limitative of the present invention.

For example, the recording time point may be acquired from the timing circuit of the host controller 2 both for normal recording and for check-out. In this case, it is sufficient if, during normal recording, the recording time point is supplied from the host controller 2 to the MD block 1. If, in this case, time has not been set in the timing circuit of the host controller 2 or if the timing circuit is not in operation, check-out itself may be disabled to prohibit illicit use of audio data.

Conversely, the recording time can be obtained from the timing circuit of the MD block 1 both for normal recording and for check-out. In this case, it is sufficient if the recording time point is sent in check-out from the MD block 1 to the host controller 2. If, in this case, time has not been set in the timing circuit of the MD block 1 or if the timing circuit is not in operation, check-out itself may again be disabled to prohibit illicit use of audio data.

If check-out cannot be made because the check-out has been made to the allowed limit or if check-in cannot be made, it is of course possible to display an error message on for example a display unit 511 of the host controller 2 to notify to the user the reason why check-out or check-in is not possible.

[Another Example of Statement of Different Recording Time]

In the above-described embodiment, the value of the number of seconds of the recording time for normal recording and that for check-out are necessarily set to 0 (zero) and to other than 0 (zero) in order to make distinction between the track prepared by normal recording and that prepared by check-out in the MD system 1. This, however, is not limitative.

For example, the number of seconds of the recording time point during normal recording and that during check-out may take only an even number and an odd number, respectively. Conversely, the number of seconds of the recording time point during normal recording and that during check-out may take only an odd number and an even number, respectively. By determining for which of the case of normal recorded and the case of check-out the number of seconds of the recording time is to be an even number or an odd number, it can be determined from the information of the UTOC sector 2 associated with given audio data whether the audio data is data recorded by normal recording or data recorded by check-out.

As another method which enables the case of normal recording to be discerned from the case of check-out based on the value of the number of seconds of the recording time point during normal recording, modulo operations may be used. For example, for normal recording, the value of the number of seconds of the recording time recorded on the UTOC sector 2 is set to 4 n, where n is an integer not less than 1, hereinafter the same. The value of the number of seconds of the recording time during check-out for the first check-out, that for the second check-out and that for the third check-out are set to 4n+1, 4n+2 and to 4n+3, respectively.

If modulo operations of (N mod 4) are executed on the so set value N, that is if the remainder of division of N by 4, is found, it can be found whether the audio data in question is that recorded normally or that recorded by check-out and, if the audio data in question is that recorded by check-out, it can also be known with which number of times of check-out the audio data in question has been recorded.

Although it is assumed here that the number of times of check-out recording of the same audio data is three, the value of the number of seconds of the recording time can, of course, be set depending on the number of check-outs for the same audio data.

It is also possible to differentiate not the recording time but the model code recorded similarly on the UTOC sector 2 between the case of normal recording and that during check-out. Meanwhile, it is assumed that the same model code as that of the present system is to be allocated only to a system having similar means.

As a further modification, if the compressed audio signals are decrypted to record on the MD the duplication inhibit flag of the bit d2 of the Trackmode of the parts table of the UTOC sector 0 shown in FIG. 5, the duplication inhibit flag is set to ON.

If non-encrypted compressed audio signals, transmitted from the CD player with optical digital out, are recorded on a MD, the duplication inhibit flag is turned OFF. If non-encrypted analog audio signals, transmitted in an analog form from the CD player, are converted by the MD unit into compressed digital audio signals and recorded in this form on the MD, the duplication inhibit flag is similarly turned OFF.

This makes it possible for the mini-disc unit to discern whether the compressed digital audio signals recorded on the mini-disc encrypted compressed digital audio signals, subjected to duplication number management, or non-encrypted compressed digital audio signals, not subjected to duplication number management, based on the bit d2 of the Trackmode of the parts table of the UTOC sector 0.

By using the information of the UTOC information, associated with each audio data recorded, duplicated tracks (audio data) can be discriminated as compatibility with the conventional format is maintained, whereby the operations of check-out and check-in can be realized even in case the mini-disc is used as a recording medium.

In the above-described embodiment of the audio reproducing system, the identification information, recording tie point, maker code and the model code of the checked-out audio data are maintained on the part of the controller 200. this, however is not limitative such that the information concerning the audio data can also be managed on the part of the host controller 2.

By so doing, the totality of audio data, recorded by the audio recording and/or reproducing system, can be monistically supervised on the part of the host controller 2.

In the above-described embodiment, the audio data compressed in accordance with the ATRAC system is checked-out or checked-in between the MD block 1 and the host controller 2. This, however, is again not limitative.

If, for example, the audio signals from an analog input terminal 213 of the host controller 2 are sent through an analog input terminal 134 of the MD block 1 to the MD block 1, the check-out and check-in operations can be realized, in the same way as in the above-described embodiment.

Moreover, if non-compressed audio data is sent through a digital output terminal or a digital input/output terminal, not shown, of the host controller 2, to the MD block 1, or if the decompressed audio data is supplied through the digital audio input terminal 121 of the MD block 1 to the MD block 1, the check-out and check-in operations can be realized, in the same way as in the above-described embodiment.

That is, the audio data transmitted or received between the MD block 1 and the host controller 2 may be digital audio data or analog audio signals. If the audio data is digital audio data, it may be compressed or not compressed. In sum, it is only necessary to differentiate the UTOC information between the route performing duplication number management and the route not performing duplication number management.

The audio recording and/or reproducing system is not limited to the above-described embodiment. For example, the present invention may be applied to, for example, a system of variable configurations provided with a DVD (Digital Versatile Disc) reproducing unit, a recording and/or reproducing unit or a monitor receiver for duplicating target data.

In the foregoing embodiment, it is assumed that audio data is to be recorded on a mini-disc. This again is not limitative. That is, the present invention may be applied to a variety of recording mediums having the management information for a set of recorded data, such as recorded set of data, for example, audio data for a musical air recorded on a mini-disc.

The present invention may be applied to equipment or recording and/or reproducing systems, handling so-called variable content data, such as various data processed as a set, for recording on the recording medium, such as video data, text data or game programs.

INDUSTRIAL APPLICABILITY

According to the present invention, as described above, data (tracks) duplicated over a preset channel can be discriminated as compatibility is maintained with respect this to the conventional formats. in this manner, the so-called check-out and check-in operations, realized by duplication number management, can be realized in case of using a recording medium such as mini-disc being used extensively.

The invention claimed is:

1. A duplication management method in duplicating main information to a recording medium having a main information area in which said main information is recorded and a management area in which the management information for each item of said main information recorded in said main information area is recorded, wherein
    said main information can be duplicated to said recording medium after being received from one of a first route for duplicating said main information without performing duplication number management and a second route for duplicating said main information with duplication number management;
    the statement of a portion of said management information for said main information duplicated to said recording medium is differentiated based on whether said main information is received and duplicated from said first route or said main information is received and duplicated from said second route; and wherein
    said portion of said management information is stored and held as duplication hysteresis information at least in case said main information is duplicated to said recording medium after being received via said second route.

2. The duplication management method according to claim 1 wherein the portion of said management information the statement of which is differentiated is a duplication inhibit flag for each item of said main information.

3. The duplication management method according to claim 1 wherein the portion of said management information the statement of which is differentiated is the time information for time of recording said main information on said recording medium.

4. The duplication management method according to claim 1 wherein the portion of said management information the statement of which is differentiated is an equipment identifier of an equipment with which said main information is recorded on said recording medium.

5. The duplication management method according to claim 3 wherein one of an even number and an odd number is allocated to a preset digit of said time information for said main information recorded from said first route on said recording medium and the other of the even number and the odd number is allocated to a preset digit of said time information for said main information recorded from said second route on said recording medium to differentiate the statement of said time information.

6. The duplication management method according to claim 3 wherein a preset fixed value is allocated to a preset digit of said time information for said main information recorded from said first route on said recording medium and a fixed value except said preset fixed value is allocated to a preset digit of said time information for said main information recorded from said second route on said recording medium to differentiate the statement of said time information.

7. The duplication management method according to claim 1 wherein said duplication hysteresis information includes the equipment identifier of the equipment which has made the duplication, in addition to said time information; said equipment identifier being included in said management information.

8. A duplication management system comprising a recording device for duplicating the main information to a recording medium having a main information area in which the main information is recorded and a management area in which the management information for each item of said main information recorded in said main information area is recorded, and a management device for controlling and supervising duplication by said recording device; said recording device comprising:
    a first route from which main information is received and duplicated without performing duplication number management;
    a second route from which main information is received and duplicated with duplication number management;
    management information recording means for recording said management information in said management area of said recording medium, the statement of a portion of said management information is differentiated based on whether said main information is received and duplicated from said first route or said main information is received and duplicated from said second route; and
    said management device including duplication hysteresis information storage means for storing and holding said portion of said management information recorded in said management area at least in case said main information is duplicated to said recording medium from said second route.

9. The duplication management system according to claim 8 wherein the portion of said management information the statement of which is differentiated is a duplication inhibit flag for each item of said main information.

10. The duplication management system according to claim 8 wherein the statement of the time information for time of recording the main information on said recording medium, as said portion of the management information, is differentiated.

11. The duplication management system according to claim 8 wherein the statement of an equipment identifier of a recording equipment used in recording said main information on said recording medium, as said portion of said management information, is differentiated.

12. The duplication management system according to claim 10 wherein one of an even number and an odd number is allocated to a preset digit of said time information for said main information recorded from said first route on said recording medium and the other of the even number and the odd number is allocated to a preset digit of said time information for said main information recorded from said second route on said recording medium to differentiate the statement of said time information.

13. The duplication management system according to claim 10 wherein a preset fixed value is allocated to a preset digit of said time information for said main information recorded from said first route on said recording medium and a fixed value except said preset fixed value is allocated to a preset digit of said time information for said main information recorded from said second route on said recording medium to differentiate the statement of said time information.

14. The duplication management system according to claim 10, wherein said management device includes equipment identifier acquisition means for acquiring an equipment identifier in said management information of said recording device which has duplicated said main information and wherein said duplication hysteresis information storage means stores and holds said equipment identifier acquired by said equipment identifier acquisition means as said equipment identifier also is included in said duplication hysteresis information.

15. A recording device for duplicating the main information to a recording medium having a main information area in which the main information is recorded and a management area in which the management information for each item of said main information recorded in said main information area is recorded; said recording device comprising:
 a first route from which main information is received and duplicated without performing duplication number management;
 a second route from which main information is received and duplicated with duplication number management; and
 management information recording means for recording said management information in said management area of said recording medium, the statement of a portion of said management information is differentiated based on whether said main information is received and duplicated from said first route or said main information is received and duplicated from said second route.

16. The recording device according to claim 15 wherein the portion of said management information, the statement of which is differentiated, is a duplication inhibiting flag associated with each item of said main information.

17. The recording device according to claim 15 wherein the portion of said management information is the time information for time of recording said main information on said recording medium.

18. The recording device according to claim 15 wherein the portion of said management information is an equipment identifier of an equipment which records said main information on said recording medium.

19. The recording device according to claim 17 wherein one of an even number and an odd number is allocated to a preset digit of said time information for said main information recorded through said first route on said recording medium and the other of the even number and the odd number is allocated to a preset digit of said time information for said main information recorded through said second route on said recording medium.

20. The recording device according to claim 17 wherein said management information forming means allocates a preset fixed value to a preset digit of said time information for said main information recorded through said first route on said recording medium and a fixed value except said preset fixed value to a preset digit of said time information for said main information recorded through said second route on said recording medium.

21. A duplication management apparatus for controlling and managing duplication by a recording device duplicating main information to a recording medium having a main information area in which the main information is recorded and a management area in which management information for each item of said main information recorded in said main information area is recorded; wherein said recording device is configured to differentiate a statement of a portion of said management information corresponding to said main information duplicated to said recording medium received from a first route designed for duplicating said main information without performing duplication number management, from the statement of a portion of said management information corresponding to said main information duplicated to said recording medium received from a second route designed for duplicating said main information with duplication number management; and wherein
the duplication management apparatus includes duplication hysteresis information storage means for storing and holding a portion of said management information recorded in said management area at least in case said recording device duplicates the main information received from said second route, as the duplication hysteresis information.

22. The duplication management apparatus according to claim 21 wherein the portion of said management information the statement of which is differentiated is a duplication inhibit flag corresponding to each item of said main information.

23. The duplication management apparatus according to claim 21 wherein the portion of said management information is the time information for time of recording said main information on said recording medium.

24. The duplication management apparatus according to claim 21 wherein said management information is an equipment identifier of an equipment used for recording the main information on said recording medium.

25. The duplication management apparatus according to claim 23 wherein one of an even number and an odd number is allocated to a preset digit of said time information for said main information recorded from said first route on said recording medium and the other of the even number and the odd number is allocated to a preset digit of said time information for said main information recorded from said second route on said recording medium.

26. The duplication management apparatus according to claim 23 wherein said management information forming means allocates a preset fixed value to a preset digit of said time information for said main information recorded from said first route on said recording medium and a fixed value except said preset fixed value to a preset digit of said time information for said main information recorded from said second route on said recording medium.

27. The duplication management apparatus according to claim 23 further comprising equipment identifier acquisition means for acquiring an equipment identifier of said recording device which has duplicated said main information included in said management information; said duplication hysteresis information storage means storing and holding said equipment identifier acquired by said equipment identifier acquisition means as the so acquired equipment identifier is also included in said duplication hysteresis information.

28. A duplication management apparatus comprising:
 first inputting means for receiving encrypted first digital signals;
 second inputting means for receiving non-encrypted second digital signals;
 decoding means for decrypting said first digital signals sent from said first inputting means;
 switching means for selecting the first digital signals decoded by said decoding means or said second digital signals sent from said second inputting means; and recording means for recording the digital signals selected by said switching means on a main information recording area on said recording medium and for recording in a management area on said recording medium an identifier for discriminating whether the digital signals recorded in said main information recording area are received from said first inputting means or said second inputting means.

29. The duplication management apparatus according to claim 28 wherein said identifier recorded in the management area on said recording medium for discriminating whether the digital signals recorded in said main information recording area formed in said management area on said recording medium are received from said first inputting means or said second inputting means is a duplication inhibit flag.

30. The duplication management apparatus according to claim 28 wherein said identifier recorded in the management area on said recording medium for discriminating whether the digital signals recorded in said main information recording area formed in said management area on said recording medium are are received from said first inputting means or said second inputting means is an equipment identifier.

31. The duplication management apparatus according to claim 28 wherein said identifier formed in said management area on said recording medium for discriminating whether the digital signals recorded in said main information recording area are received from said first inputting means or said second inputting means enables the discrimination by differentiating the expression of the recording time information.

32. The duplication management system according to claim 12, wherein said management device includes equipment identifier acquisition means for acquiring an equipment identifier in said management information of said recording device which has duplicated said main information and wherein said duplication hysteresis information storage means stores and holds said equipment identifier acquired by said equipment identifier acquisition means as said equipment identifier also is included in said duplication hysteresis information.

33. The duplication management system according to claim 13, wherein said management device includes equipment identifier acquisition means for acquiring an equipment identifier in said management information of said recording device which has duplicated said main information and wherein said duplication hysteresis information storage means stores and holds said equipment identifier acquired by said equipment identifier acquisition means as said equipment identifier also is included in said duplication hysteresis information.

* * * * *

UNITED STATES PATENT AND TRADEMARK OFFICE
CERTIFICATE OF CORRECTION

| | | |
|---|---|---|
| PATENT NO. | : 7,050,368 B2 | Page 1 of 1 |
| APPLICATION NO. | : 10/220300 | |
| DATED | : May 23, 2006 | |
| INVENTOR(S) | : Yuji Saito | |

It is certified that error appears in the above-identified patent and that said Letters Patent is hereby corrected as shown below:

Column 1, line 31, change "lo" to --to--.

Column 1, line 52, change "and to for" to --and for--.

Column 1, line 53, change "a system of" to (new paragraph) --Among the copyright protecting techniques formed in this SDMI, there is a system of--.

Column 2, line 17, change "lo" to --to--.

Column 11, line 8, change "y" to --by--.

Column 13, line 25, change "lo" to --to--.

Column 18, line 42, change "maybe" to --may be--.

Column 19, line 23, change "duplicated is" to --duplicated, is--.

Column 20, line 38, change "the." to --the recorded--.

Column 25, line 45, change "MI" to --MD--.

Column 26, line 16 change "step.S419)." to --step S419).--.

Column 26, line 25, change "sector-o" to --sector o--.

Column 31, line 10, change "in" to --In--.

Signed and Sealed this

Third Day of April, 2007

JON W. DUDAS
*Director of the United States Patent and Trademark Office*